US010555312B2

(12) United States Patent
Harel et al.

(10) Patent No.: US 10,555,312 B2
(45) Date of Patent: *Feb. 4, 2020

(54) ALLOCATING DIGITAL CHANNELS ASSOCIATED WITH COMMUNICATIONS SIGNALS INTO ASSIGNED SPECTRUM CHUNKS IN A WIRELESS DISTRIBUTION SYSTEM (WDS) BASED ON DETERMINED UTILIZATION OF PROCESSING RESOURCES

(71) Applicant: Corning Optical Communications LLC, Hickory, NC (US)

(72) Inventors: Dror Harel, Hod Hasharon (IL); Gavriel Mizrahi, Tel Aviv (IL); Ofer Nisan, Netanya (IL); Dror Ben-Shlomo, Reut (IL)

(73) Assignee: Corning Optical Communications LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,862

(22) Filed: Apr. 12, 2019

(65) Prior Publication Data

US 2019/0239230 A1   Aug. 1, 2019

Related U.S. Application Data

(63) Continuation of application No. 15/478,473, filed on Apr. 4, 2017, now Pat. No. 10,292,168.

(Continued)

(51) Int. Cl.
*H04W 72/04* (2009.01)
*H04W 88/08* (2009.01)

(52) U.S. Cl.
CPC ..... *H04W 72/0493* (2013.01); *H04W 88/085* (2013.01)

(58) Field of Classification Search
CPC ....... H04L 5/0007; H04L 5/023; H04H 20/69; H04M 7/006; H04N 21/2383; H04N 21/2385
See application file for complete search history.

(56) References Cited

U.S. PATENT DOCUMENTS

| | | | |
|---|---|---|---|
| 7,310,522 B2 | 12/2007 | Geile | |
| 2006/0083512 A1* | 4/2006 | Wake | H04B 10/25754 398/59 |

(Continued)

*Primary Examiner* — Ayaz R Sheikh
*Assistant Examiner* — Debebe A Asefa
(74) *Attorney, Agent, or Firm* — C. Keith Montgomery

(57) ABSTRACT

Embodiments of the disclosure relate to allocating digital channels into spectrum chunks in a wireless distribution system (WDS). In a WDS, a central unit is configured to communicate downlink and uplink communications signals with a plurality of remote units over a plurality of downlink and uplink communication links. In one aspect, discrete downlink channels in the downlink communications signals are grouped into downlink spectrum chunks at the central unit when the processing circuitry at the central unit is underutilized. In another aspect, discrete uplink channels in the uplink communications signals are grouped into uplink spectrum chunks at the remote units when the processing circuitries at the remote units are underutilized. By grouping discrete downlink channels into downlink spectrum chunks and/or grouping uplink discrete channels into uplink spectrum chunks, it is possible to optimize system resource utilization in the WDS, thus providing enhanced overall performance in the WDS.

20 Claims, 13 Drawing Sheets

Related U.S. Application Data

(60) Provisional application No. 62/329,599, filed on Apr. 29, 2016.

(56) References Cited

U.S. PATENT DOCUMENTS

| | | |
|---|---|---|
| 2010/0099451 A1 | 4/2010 | Saban et al. |
| 2014/0044044 A1* | 2/2014 | Josiam ................. H04W 24/10 370/328 |

* cited by examiner

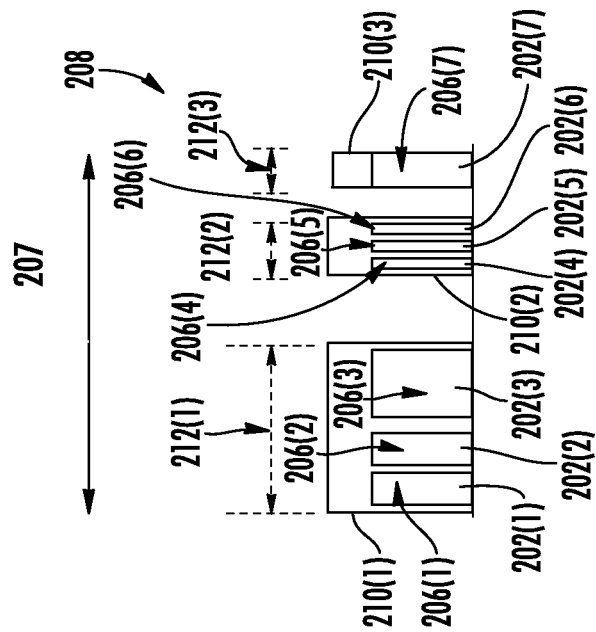
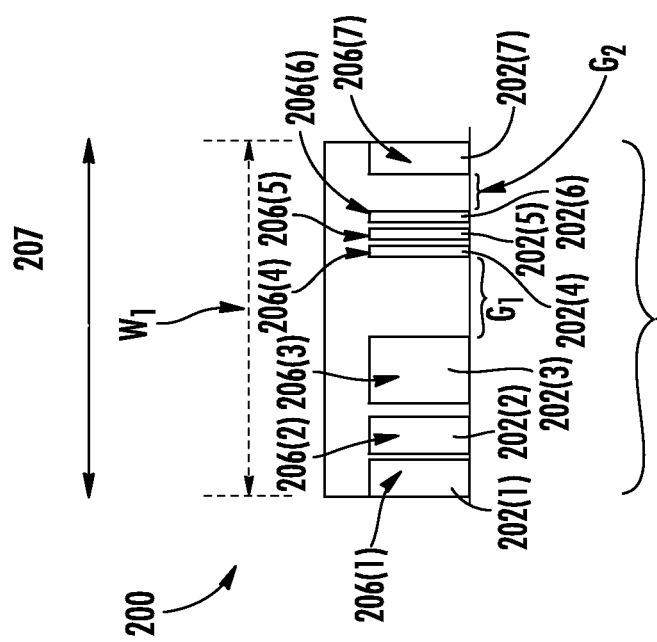

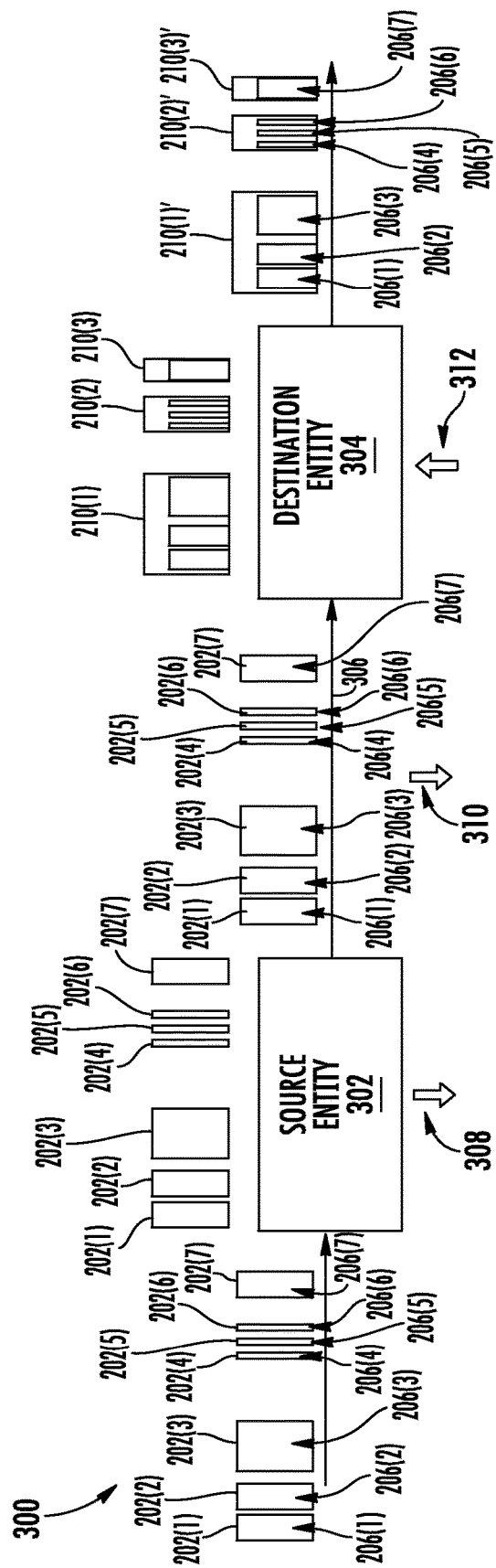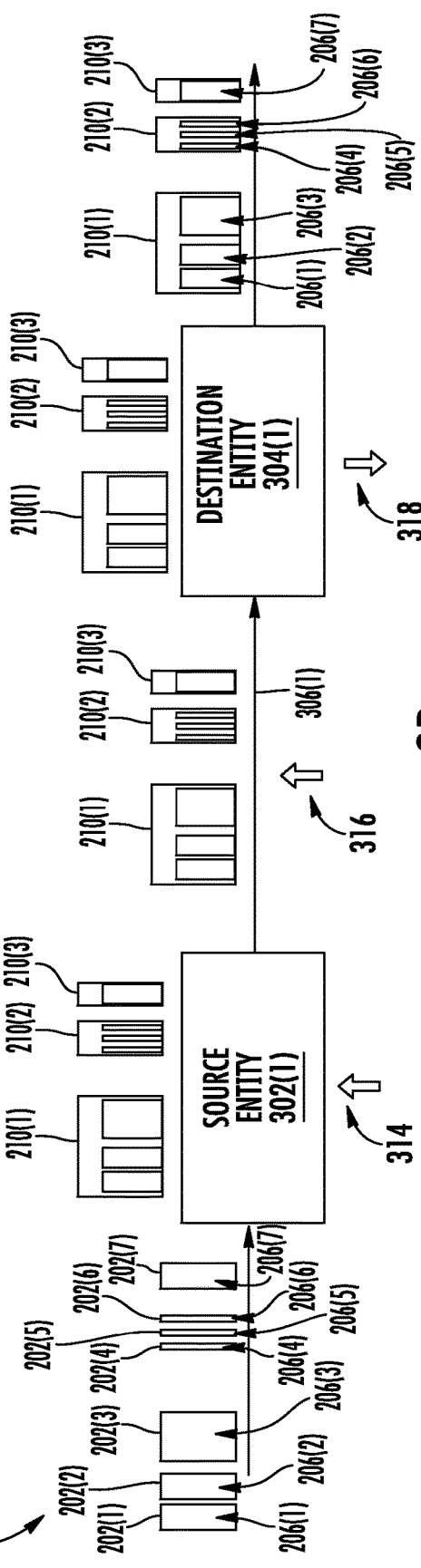
FIG. 3A
FIG. 3B

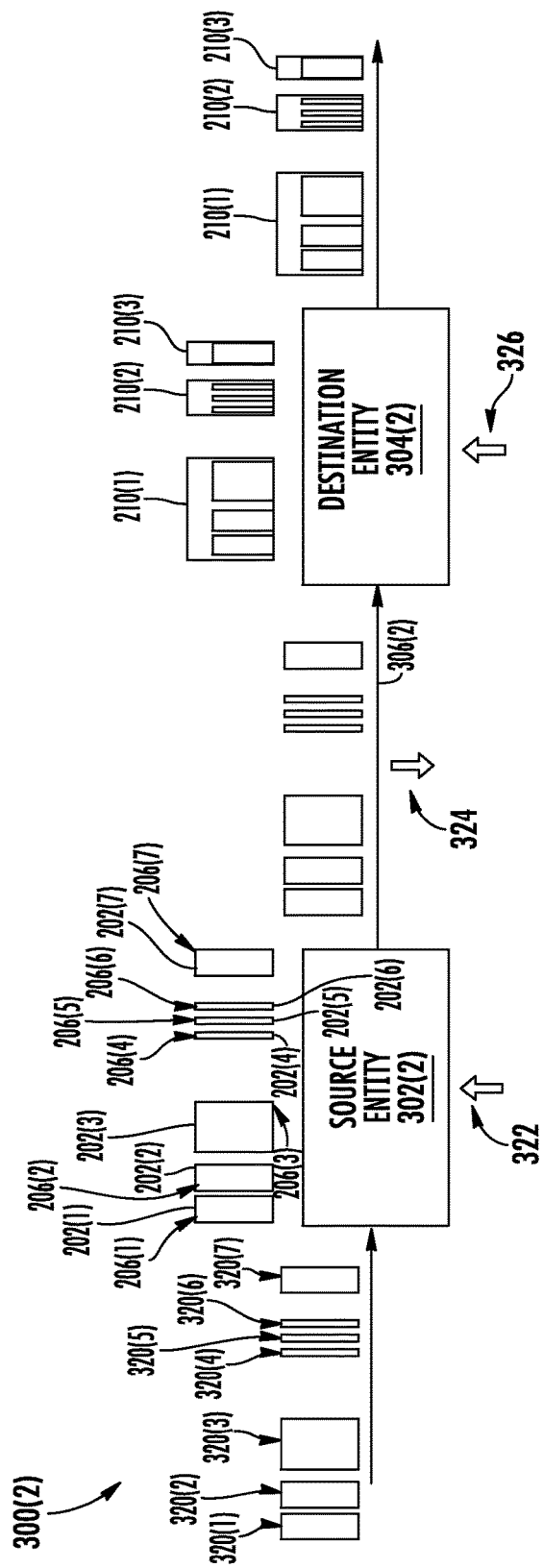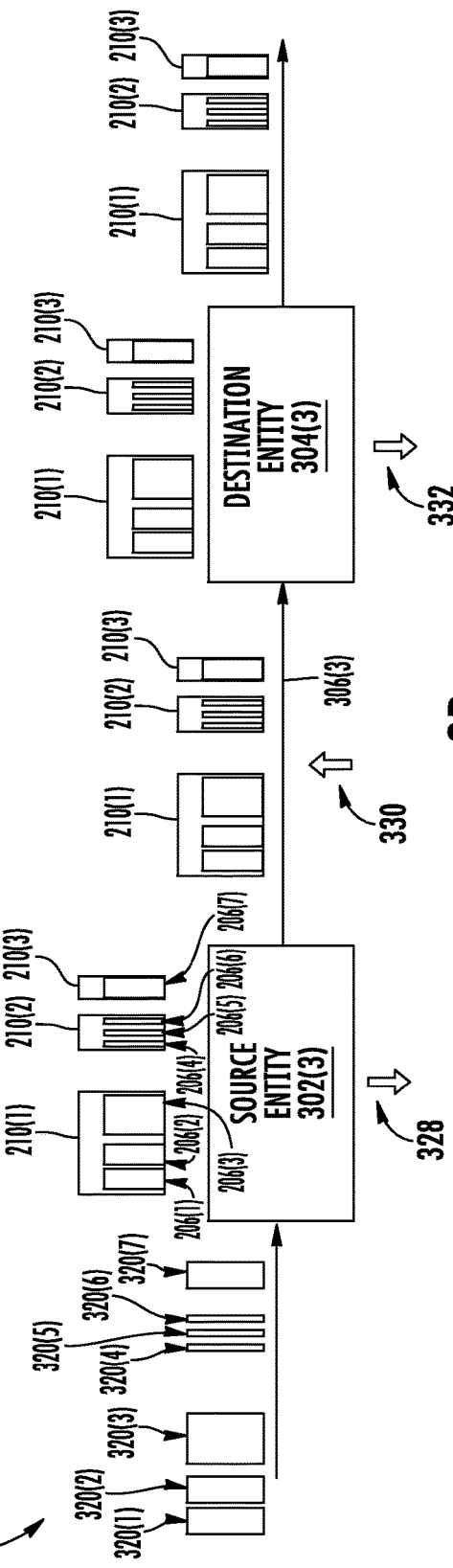

| 802 | 804 | 806 |
|---|---|---|
| COMMUNICATIONS LINK IDENTIFIER | FREQUENCY CHANNELS OCCUPIED BY DOWNLINK COMMUNICATIONS SIGNAL 412(1) OR UPLINK COMMUNICATIONS SIGNAL 422(1) | PREDEFINED RESOURCE ALLOCATION POLICY |
| 808(1) LINK 1 (e.g., DOWNLINK COMMUNICATION LINK 414(1) OR UPLINK COMMUNICATION LINK 424(1)) | 642, 435, 455, 342, 550 | 1. ELIMINATE CHANNEL 642, IF NEEDED<br>2. ELIMINATE CHANNEL 455, IF FURTHER NEEDED |
| 808(2) LINK 2 | 642, 435, 442, 485 | 1. OMIT ONE OF THE MULTIPLE-INPUT MULTIPLE-OUTPUT (MIMO) STREAMS ASSOCIATED WITH CHANNEL 442, IF NEEDED<br>2. OMIT ONE OF THE MIMO STREAMS ASSOCIATED WITH CHANNEL 485, IF FURTHER NEEDED |
| 808(3) LINK 3 | 642, 435, 440, 480 | 1. ACTIVATE COMPRESSION ALGORITHM ON IN-PHASE (I)/QUADRATURE (Q) (I/Q) SAMPLES OF CHANNELS 440 AND 480, IF NEEDED |
| ... | ... | ... |
| 808(M) LINK M | 642, 435, 455, 410, 415 | 1. REDUCE THE NUMBER OF BITS (e.g., FROM 14 BITS TO 10 BITS), IF NEEDED<br>2. ELIMINATE CHANNEL 410, IF FURTHER NEEDED |

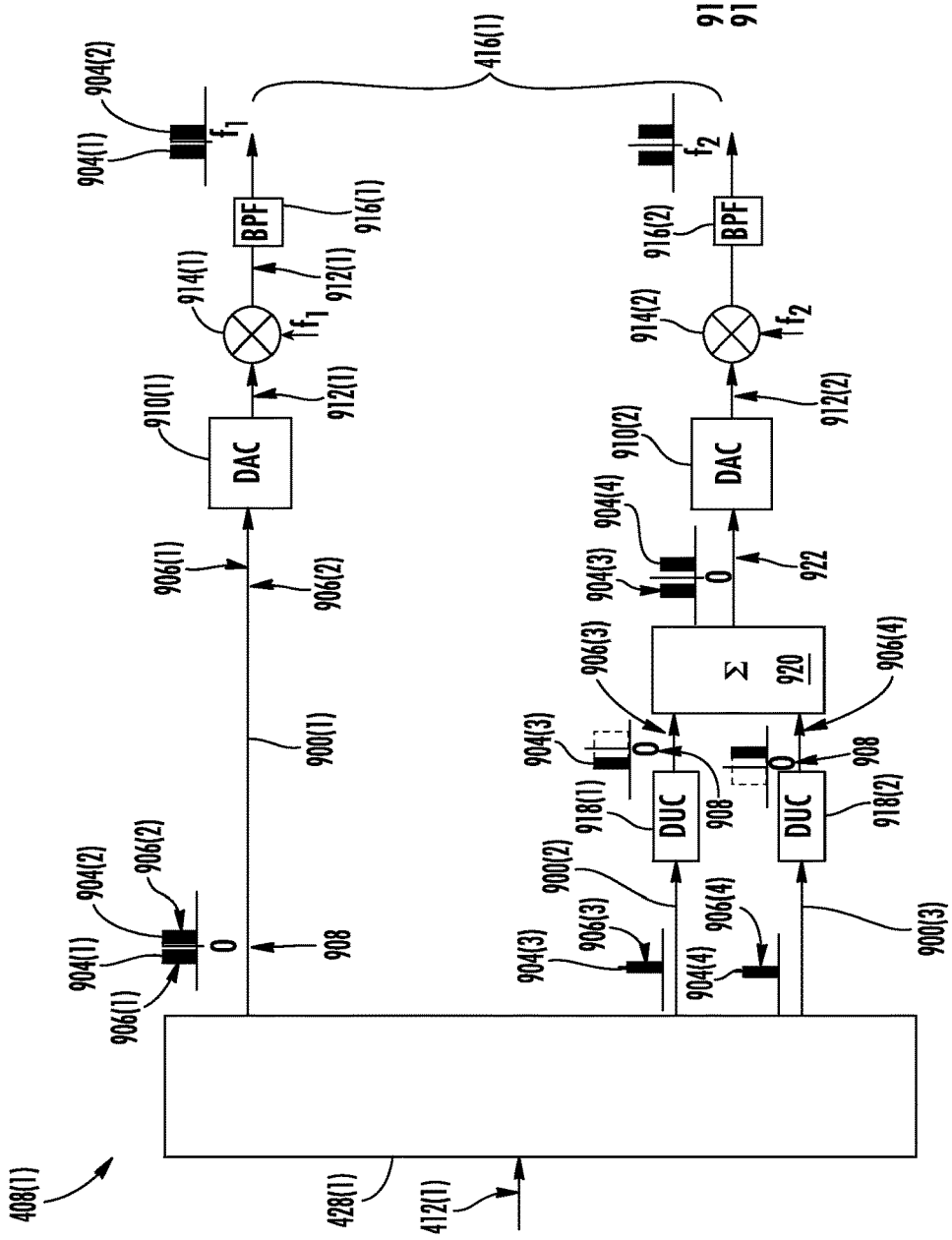
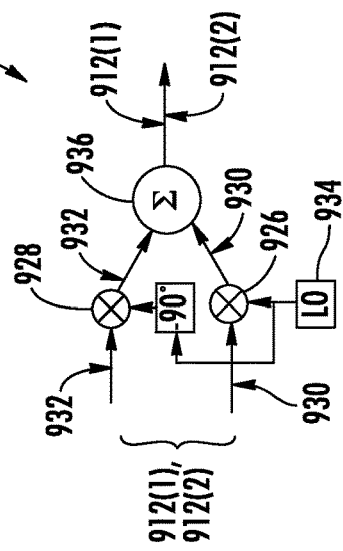
FIG. 9A
FIG. 9B

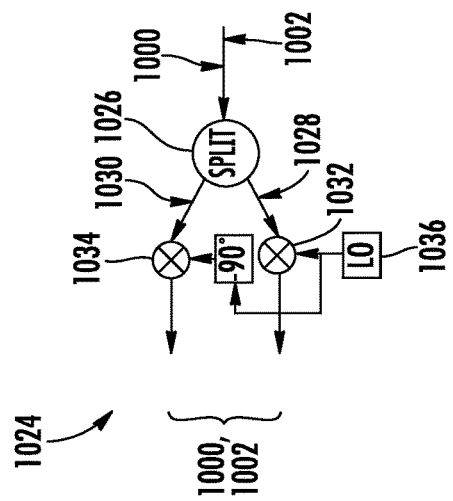
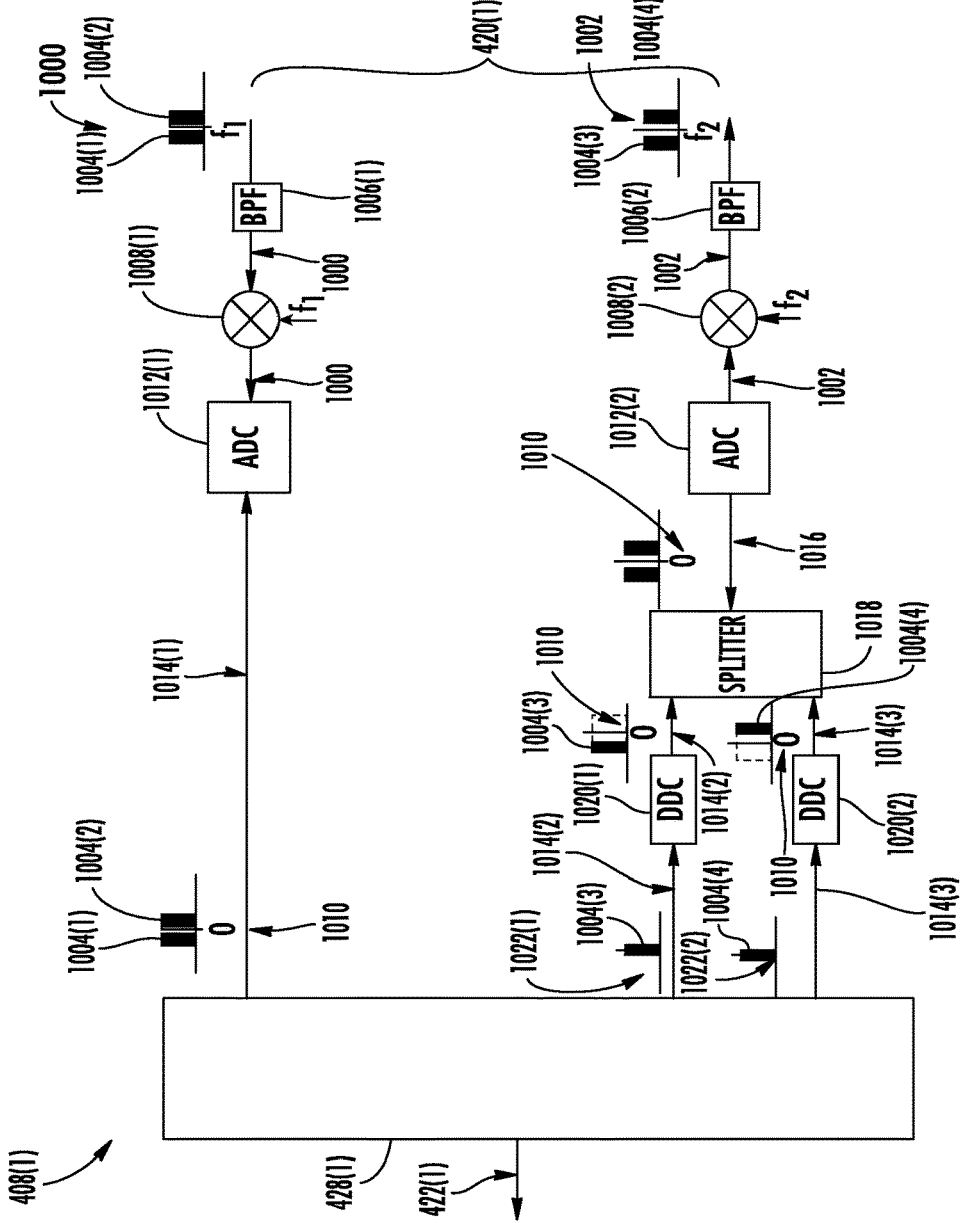
FIG. 10B
FIG. 10A

ALLOCATING DIGITAL CHANNELS ASSOCIATED WITH COMMUNICATIONS SIGNALS INTO ASSIGNED SPECTRUM CHUNKS IN A WIRELESS DISTRIBUTION SYSTEM (WDS) BASED ON DETERMINED UTILIZATION OF PROCESSING RESOURCES

PRIORITY APPLICATION

This application is a continuation of U.S. application Ser. No. 15/478,473, filed Apr. 4, 2017, which claims the benefit of priority under 35 U.S.C. § 119 of U.S. Provisional Application No. 62/329,599, filed on Apr. 29, 2016, the contents of which are relied upon and incorporated herein by reference in their entireties.

BACKGROUND

The disclosure relates generally to a wireless distribution system (WDS), and more particularly to techniques for optimizing system resources utilization within the WDS, such as a distributed antenna system (DAS), as an example.

Wireless customers are increasingly demanding digital data services, such as streaming video signals. At the same time, some wireless customers use their wireless communication devices in areas that are poorly serviced by conventional cellular networks, such as inside certain buildings or areas where there is little cellular coverage. One response to the intersection of these two concerns has been the use of a WDS. WDSs include remote units configured to receive and transmit communications signals to client devices within the antenna range of the remote units. WDSs can be particularly useful when deployed inside buildings or other indoor environments where the wireless communication devices may not otherwise be able to effectively receive radio frequency (RF) signals from a source.

In this regard, FIG. 1 illustrates distribution of communications services to remote coverage areas 100(1)-100(N) of a WDS 102, wherein 'N' is the number of remote coverage areas. These communications services can include cellular services, wireless services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a head-end equipment (HEE) 106 (e.g., a head-end controller, a head-end unit, or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the remote units 104(1)-104(N). The remote units 104(1)-104(N) are configured to receive the downlink communications signals 110D from the HEE 106 over a communications medium 112 to be distributed to the respective remote coverage areas 100(1)-100(N) of the remote units 104(1)-104(N). In a non-limiting example, the communications medium 112 may be a wired communications medium, a wireless communications medium, or an optical fiber-based communications medium. Each of the remote units 104(1)-104(N) may include an RF transmitter/receiver (not shown) and a respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

With reference to FIG. 1, the HEE 106 includes electronic processing devices, for example field-programmable gate array (FPGA), digital signal processor (DSP), and/or central processing unit (CPU), for processing the downlink communications signals 110D and the uplink communications signals 110U. Likewise, each of the remote units 104(1)-104(N) also employs electronic processing devices for processing the downlink communications signals 110D and the uplink communications signals 110U. Further, the communications medium 112 is only able to carry the downlink communications signals 110D and the uplink communications signals 110U up to a maximum bandwidth. Collectively, the processing capabilities of the electronic processing devices in the HEE 106, the processing capabilities of the electronic processing devices in the remote units 104(1)-104(N), and the maximum bandwidth of the communications medium 112 provide the system resources available in the WDS 102. It may be desirable to utilize the system resources in the WDS 102 to improve overall performance of the WDS 102.

No admission is made that any reference cited herein constitutes prior art. Applicant expressly reserves the right to challenge the accuracy and pertinency of any cited documents.

SUMMARY

Embodiments of the disclosure relate to allocating digital channels associated with communications signals into assigned spectrum chunks in a wireless distribution system (WDS) based on determined utilization of processing resources. A spectrum chunk refers to in-phase/quadrature (I/Q) samples represent signals within a certain frequency range, which is defined by a starting frequency and an ending frequency, configured to include one or more channels, such as the discrete channels. In one embodiment, the WDS includes a central unit configured to communicate downlink and uplink communications signals with a plurality of remote units over a plurality of downlink and uplink communication links. The central unit and the remote units each include processing circuitry having predefined total processing circuitry resources. In a non-limiting example, the predefined total processing circuitry resources refer to collective signal processing capabilities (e.g., read/write, encoding/decoding, modulation/de-modulation, filtering, up/down conversion, etc.) of the processing circuitry. The downlink and uplink communication links each have predefined link capacity. The system resource made available in the WDS includes the predefined total processing circuitry resources of the central unit and the remote units, as well as the predefined link capacity of the downlink and uplink communication links. In one aspect, discrete downlink channels associated with the downlink communications signals are grouped into downlink spectrum chunks at the central unit when the processing circuitry at the central unit is underutilized, thus reducing processing circuitry resource utilization at the remote units. In another aspect, discrete uplink channels associated with the uplink communications signals are grouped into uplink spectrum chunks at the remote units when the processing circuitries at the remote units are underutilized, thus reducing processing circuitry resource utilization at the central unit. By grouping discrete downlink channels into downlink spectrum chunks at the central unit and/or grouping uplink discrete channels into uplink spectrum chunks at the remote units, it is possible to optimize system resource utilization in the WDS, thus providing enhanced overall performance (e.g., designing the WDS for a given throughput with less processing resources, delivering more throughput for a given amount of processing resources, etc.).

One embodiment of the disclosure relates to a resource configuration system configured to allocate processing resources for communicating a plurality of incoming digital signals in a WDS. The resource configuration system comprises processing circuitry having a predefined total processing circuitry resource for processing the plurality of incoming digital signals. The plurality of incoming digital signals comprises a plurality of discrete channels. The processing circuitry is configured to receive the plurality of incoming digital signals. The processing circuitry is also configured to allocate each of the plurality of discrete channels to a spectrum chunk based on a spectrum chunk map. The spectrum chunk map comprises one or more spectrum chunks. Each of the one or more spectrum chunks is assigned with at least one discrete channel among the plurality of discrete channels and allocated a processing circuitry resource that is less than or equal to the predefined total processing circuitry resource. The processing circuitry is also configured to process each of the one or more spectrum chunks based on the processing circuitry resource allocated to the spectrum chunk. The resource configuration system also comprises a distribution circuit. The distribution circuit is configured to generate a plurality of outgoing digital signals each comprising at least one spectrum chunk among the one or more spectrum chunks.

Another embodiment of the disclosure relates to a method for allocating processing circuitry resource for communicating a plurality of incoming digital signals in a WDS. The method comprises determining a predefined total processing circuitry resource for processing the plurality of incoming digital signals. The plurality of incoming digital signals comprises a plurality of discrete channels. The method also comprises receiving the plurality of incoming digital signals. The method also comprises allocating each of the plurality of discrete channels to a spectrum chunk based on a spectrum chunk map. The spectrum chunk map comprises one or more spectrum chunks. Each of the one or more spectrum chunks is assigned with at least one discrete channel among the plurality of discrete channels and allocated a processing circuitry resource that is less than or equal to the predefined total processing circuitry resource. The method also comprises processing each of the one or more spectrum chunks based on the processing circuitry resource allocated to the spectrum chunk. The method also comprises generating a plurality of outgoing digital signals each comprising at least one spectrum chunk among the one or more spectrum chunks.

Another embodiment of the disclosure relates to a WDS. The WDS comprises a central unit comprising a central unit resource configuration system. The central unit resource configuration system comprises processing circuitry having a predefined total central unit processing circuitry resource for processing a plurality of downlink digital signals that comprises a plurality of discrete downlink channels. The WDS also comprises a configuration controller. The configuration controller is configured to determine a downlink spectrum chunk map for the central unit resource configuration system. The downlink spectrum chunk map comprises one or more downlink spectrum chunks determined based on a predefined spectrum-chunking algorithm. The configuration controller is also configured to assign a discrete downlink channel among the plurality of discrete downlink channels to each of the one or more downlink spectrum chunks. The configuration controller is also configured to allocate a central unit processing circuitry resource that is less than or equal to the predefined total central unit processing circuitry resource of the processing circuitry in the central unit resource configuration system to each of the one or more downlink spectrum chunks based on a predefined resource allocation policy. The central unit resource configuration system is configured to receive the plurality of downlink digital signals. The central unit resource configuration system is also configured to allocate each of the plurality of discrete downlink channels to an assigned downlink spectrum chunk based on the downlink spectrum chunk map. The central unit resource configuration system is also configured to process each of the one or more downlink spectrum chunks based on the central unit processing circuitry resource allocated to the downlink spectrum chunk. The central unit resource configuration system is also configured to generate a plurality of downlink digital communications signals each comprising at least one downlink spectrum chunk among the one or more downlink spectrum chunks. The WDS also comprises a plurality of remote units. The plurality of remote units is configured to receive the plurality of downlink digital communications signals from the central unit over a plurality of downlink communication links, respectively. The plurality of remote units is also configured to convert the plurality of downlink digital communications signals into a plurality of downlink radio frequency (RF) communications signals for distribution to client devices.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure. The drawings illustrate one or more embodiment(s), and together with the description serve to explain principles and operation of the various embodiments.

BRIEF DESCRIPTION OF THE DRAWINGS

FIG. 2A is a schematic diagram of an exemplary conventional channel grouping scheme for grouping a plurality of discrete channels in a wide-bandwidth spectrum chunk;

FIG. 2B is a schematic diagram of an exemplary channel grouping scheme for grouping the discrete channels of FIG. 2A into one or more spectrum chunks;

FIG. 3A is a schematic diagram of an exemplary WDS in which a source entity is configured to support the discrete channels of FIG. 2A according to an individual channel-based scheme;

FIG. 3B is a schematic diagram of an exemplary WDS in which a source entity is configured to support the discrete channels of FIG. 2A according to the channel grouping scheme of FIG. 2B;

FIG. 3C is a schematic diagram of an exemplary WDS in which a source entity is configured to communicate a plurality of analog streams in the discrete channels of FIG. 2A according to the individual channel-based scheme of FIG. 3A;

FIG. 3D is a schematic diagram of an exemplary WDS in which a source entity is configured to communicate the analog streams of FIG. 3C in the discrete channels of FIG. 2A according to the channel grouping scheme of FIG. 2B;

FIG. 8 is a table providing an exemplary illustration of the predefined resource allocation policy of FIG. 4 that can be used to configure the central unit resource configuration system and the remote unit resource configuration systems in the WDS in FIG. 4 for optimizing system resources utilization;

FIG. 9A is a schematic diagram providing an exemplary illustration of a remote unit configured to process a downlink digital communications signal received from a central unit;

FIG. 9B is a schematic diagram of an exemplary analog in-phase (I)/quadrature (Q) (I/Q) de-modulator that can be provided in the remote unit of FIG. 9A;

FIG. 10A is a schematic diagram providing an exemplary illustration of a remote unit configured to generate an uplink digital communications signal based on an uplink radio frequency (RF) communications signal;

FIG. 10B is a schematic diagram of an exemplary analog I/Q modulator that can be provided in the remote units of FIG. 10A;

DETAILED DESCRIPTION

Embodiments of the disclosure relate to allocating digital channels associated with communications signals into assigned spectrum chunks in a wireless distribution system (WDS) based on determined utilization of processing resources. A spectrum chunk refers to in-phase/quadrature (I/Q) samples represent signals within a certain frequency range, which is defined by a starting frequency and an ending frequency, configured to include one or more channels, such as the discrete channels. In one embodiment, the WDS includes a central unit configured to communicate downlink and uplink communications signals with a plurality of remote units over a plurality of downlink and uplink communication links. The central unit and the remote units each include processing circuitry having predefined total processing circuitry resources. In a non-limiting example, the predefined total processing circuitry resources refer to collective signal processing capabilities (e.g., read/write, encoding/decoding, modulation/de-modulation, filtering, up/down conversion, etc.) of the processing circuitry. The downlink and uplink communication links each have predefined link capacity. The system resource made available in the WDS includes the predefined total processing circuitry resources of the central unit and the remote units, as well as the predefined link capacity of the downlink and uplink communication links. In one aspect, discrete downlink channels associated with the downlink communications signals are grouped into downlink spectrum chunks at the central unit when the processing circuitry at the central unit is underutilized, thus reducing processing circuitry resource utilization at the remote units. In another aspect, discrete uplink channels associated with the uplink communications signals are grouped into uplink spectrum chunks at the remote units when the processing circuitries at the remote units are underutilized, thus reducing processing circuitry resource utilization at the central unit. By grouping discrete downlink channels into downlink spectrum chunks at the central unit and/or grouping uplink discrete channels into uplink spectrum chunks at the remote units, it is possible to optimize system resource utilization in the WDS, thus providing enhanced overall performance (e.g., designing the WDS for a given throughput with less processing resources, delivering more throughput for a given amount of processing resources, etc.).

Figure 1:
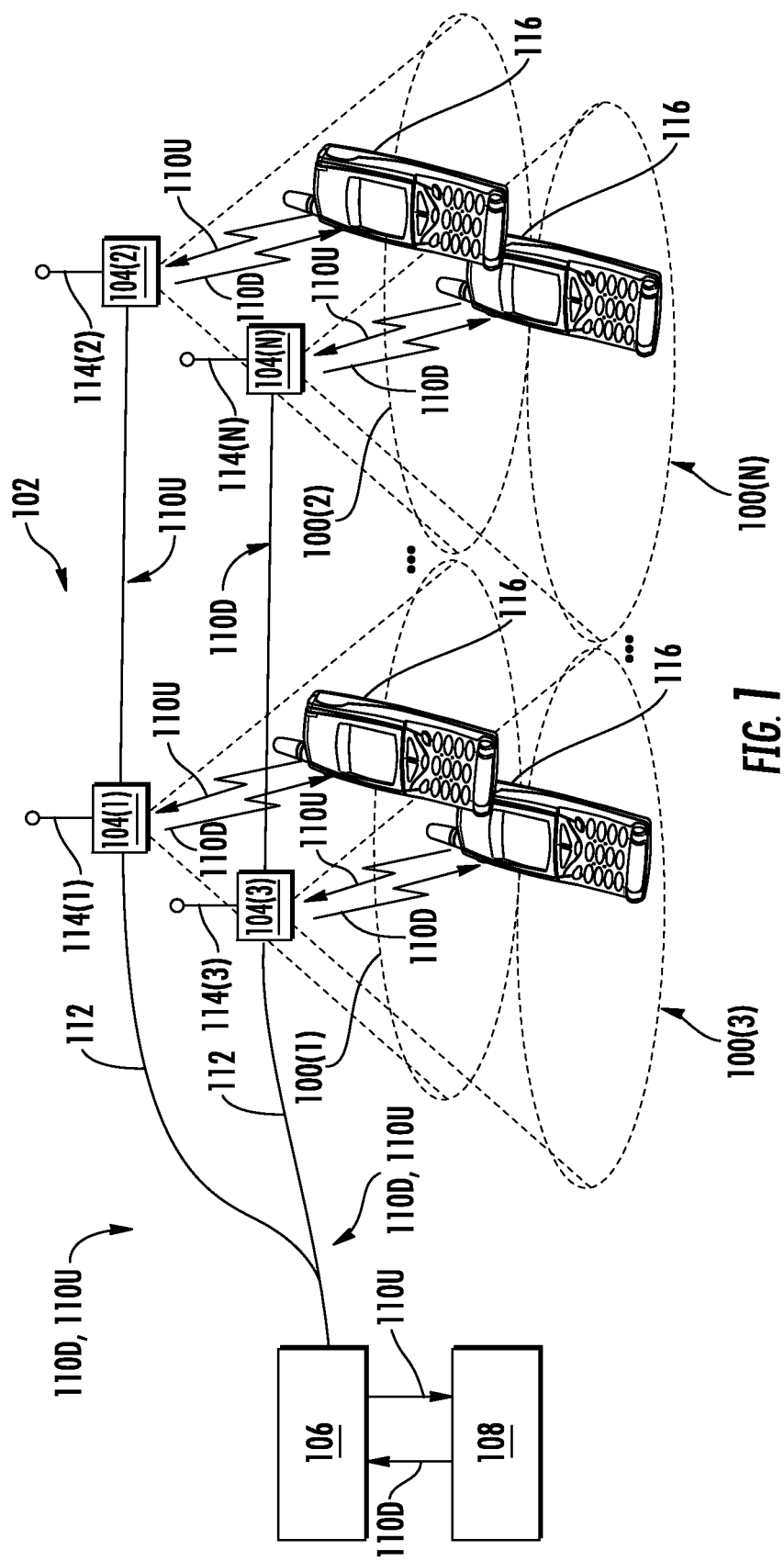
FIG. 1 illustrates distribution of communications services to remote coverage areas of a wireless distribution system (WDS)
Figure 4:
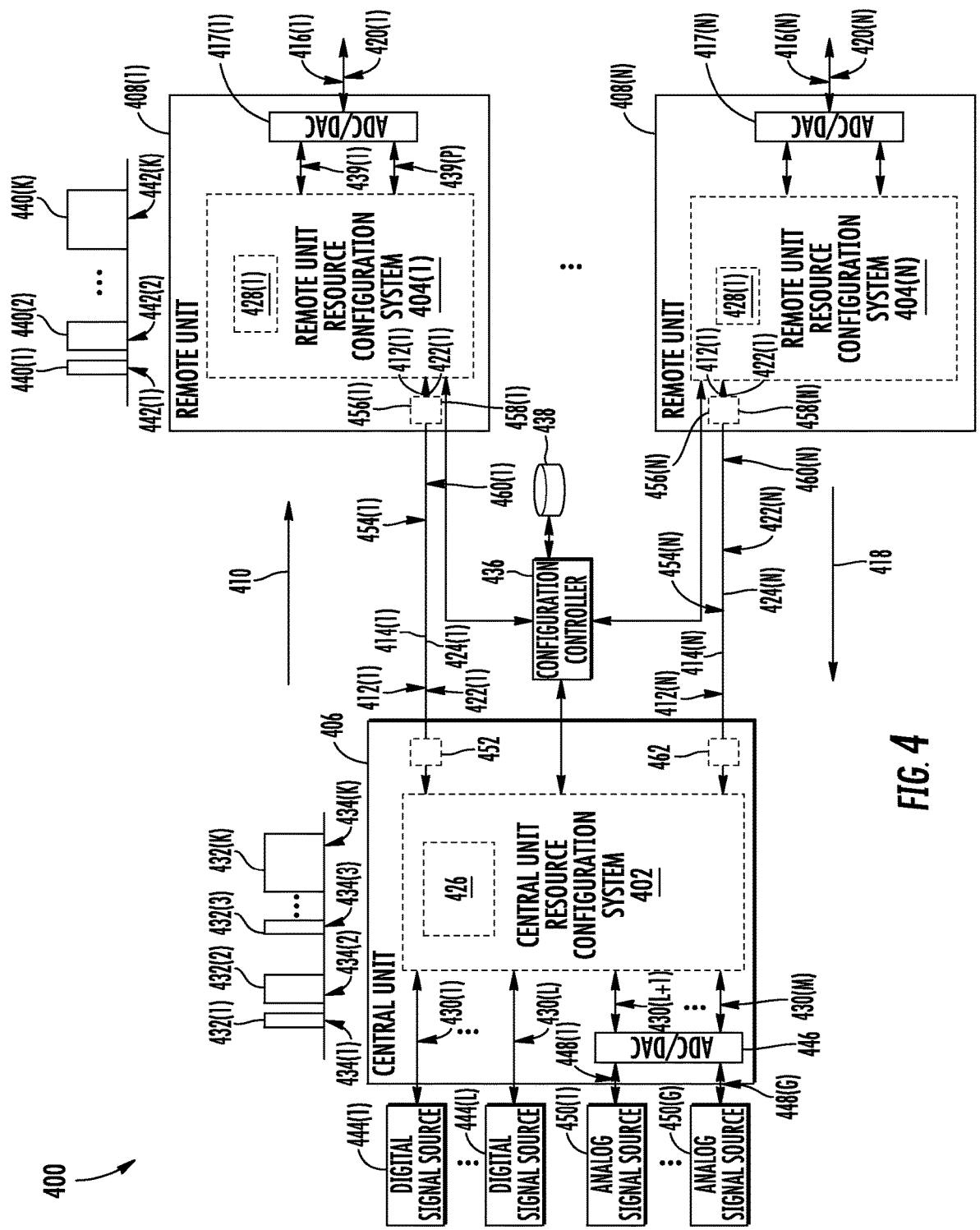
FIG. 4 is a schematic diagram of an exemplary WDS that includes a central unit resource configuration system and a plurality of remote unit resource configuration systems for allocating digital channels associated with communications signals into spectrum chunks in the WDS based on a predefined spectrum-chunking algorithm and a predefined resource allocation policy.

Before discussing examples of allocating digital channels associated with communications signals into assigned spectrum chunks in a WDS based on determined utilization of processing resources starting at FIG. 4, a definition of common terminologies used throughout the present application is first provided. An overview of various methods for communicating a plurality of channels between a source entity and a destination entity and corresponding system resource utilization implications are then discussed with references to FIGS. 2A-2B and 3A-3D. The discussion of specific exemplary aspects of allocating communications signals into assigned spectrum chunks in a WDS based on determined utilization of processing resources starts with reference to FIG. 4.

A spectrum chunk in the context of the present application refers to in-phase (I) and quadrature (Q) (IQ) samples within a certain frequency range that is defined by a starting frequency and an ending frequency and can be configured to include one or more discrete channels. It shall be appreciated that the one or more discrete channels included in the spectrum chunk can be adjacent or non-adjacent. In a non-limiting example, the spectrum chunk can be identical to a spectrum of a discrete channel, which originate from a baseband unit (BBU) or sampled/filtered from an analog radio frequency (RF) signal(s).

A digital stream of a spectrum chunk in the context of the present application includes the IQ samples of the spectrum chunk (located at a baseband). Since a spectrum chunk can include multiple discrete channels, the digital stream of a spectrum chunk may include the IQ samples associated with the multiple discrete channels included in the spectrum chunk.

FIG. 2A is a schematic diagram of an exemplary conventional channel grouping scheme 200 for supporting a plurality of discrete channels 202(1)-202(7) in a wide-bandwidth spectrum chunk 204. The discrete channels 202(1)-202(7) are communicated across a communication link 207 in a communications system, such as a WDS. The discrete channels 202(1)-202(7) and the digital streams 206(1)-206(7) as illustrated herein are examples for the convenience of reference and shall not be interpreted as limiting. In a non-limiting example, the discrete channels 202(1), 202(2), and 202(7) each have a five (5) megahertz (MHz) bandwidth. The discrete channels 202(4)-202(6) each have a 1250 kilohertz (KHz) or 1.25 MHz bandwidth. The discrete channel 202(3) has a ten (10) MHz bandwidth. The discrete channel 202(3) is separated from the discrete channel 202(4) by a first unused spectrum $G_1$, which may be 10 MHz in this example and provides spectrum separation between the discrete channel 202(3) and the discrete channel 202(4). The discrete channel 202(6) is separated from the discrete channel 202(7) by a second unused spectrum $G_2$, which may be 5 MHz in this example. In this regard, to communicate the discrete channels 202(1)-202(7) in the wide-bandwidth spectrum chunk 204, bandwidth $W_1$ of the wide-bandwidth spectrum chunk 204 needs to be greater than or equal to the total bandwidth of the discrete channels 202(1)-202(7), the first unused spectrum $G_1$, and the second unused spectrum $G_2$. According to the above example, the bandwidth $W_1$ of the wide-bandwidth spectrum chunk 204 needs to be at least 43.75 MHz to support the discrete channels 202(1)-202(7) in the wide-bandwidth spectrum chunk 204. As a result, the conventional channel grouping scheme 200 needs to support a higher aggregated data rate, thus leading to increased data throughput.

However, the conventional channel grouping scheme 200 has two potential consequences. First, the digital streams 206(1)-206(7) associated with the discrete channels 202(1)-202(7) need to be processed (e.g., sampled, digitized, encoded, channelized, combined, etc.) before being communicated in the wide-bandwidth spectrum chunk 204. As a result, the conventional channel grouping scheme 200 may require more signal processing, thus leading to a higher demand for processing resources (e.g., field-programmable gate array (FPGA), digital signal processor (DSP), central processing unit (CPU), etc.). Second, the communication link 207 configured to support the wide-bandwidth spectrum chunk 204 needs to have a communication link bandwidth greater than or equal to the bandwidth $W_1$ of the wide-bandwidth spectrum chunk 204. This may prove challenging in some WDS deployments.

To reduce the bandwidth requirement on the communication link 207 and the demand for processing resources, it is possible to communicate the digital streams 206(1)-206(7) in the discrete channels 202(1)-202(7) individually (hereinafter referred to as an "individual channel-based scheme"). In this regard, according to the above non-limiting example, the communication link 207 needs to support an aggregated bandwidth higher than the 10 MHz bandwidth, which includes a sum of all bandwidths (excluding the first unused spectrum $G_1$ and the second unused spectrum $G_2$) among the discrete channels 202(1)-202(7), to communicate each of the digital streams 206(1)-206(7). Further, since the digital streams 206(1)-206(7) are communicated individually, the individual channel-based scheme requires less signal processing at a central unit, thus reducing the demand for processing resources (e.g., FPGA, DSP, CPU, etc.) at the central unit at the expense of increased resource requirement at remote units. However, since the communication link 207 has a reduced bandwidth, the aggregated data rate will be lower than in the conventional channel grouping scheme 200.

The conventional channel grouping scheme 200 and the individual channel-based scheme, as discussed above, each have advantages and disadvantages. It may be desirable to achieve a balance between easing the bandwidth requirement for the communication link 207 and reducing the demand for processing resources when communicating digital streams, such as the exemplary digital streams 206(1)-206(7) in FIG. 2A. In this regard, FIG. 2B is a schematic diagram of an exemplary channel grouping scheme 208 for grouping the discrete channels 202(1)-202(7) of FIG. 2A in one or more spectrum chunks 210(1)-210(3). Common elements between FIGS. 2A and 2B are shown therein with common element numbers and will not be re-described herein.

With reference to FIG. 2B, the spectrum chunk 210(1) includes the discrete channels 202(1)-202(3) and has a first spectrum chunk bandwidth 212(1) that is greater than or equal to a total bandwidth of the discrete channels 202(1)-202(3), which is twenty (20) MHz, for example. In a non-limiting example, the spectrum chunk 210(1) can include unused spectrum between the discrete channels 202(1)-202(3). The spectrum chunk 210(1) is configured to communicate the digital streams 206(1)-206(3). The spectrum chunk 210(2) includes the discrete channels 202(4)-202(6) and has a second spectrum chunk bandwidth 212(2) that is greater than or equal to a total bandwidth of the discrete channels 202(4)-202(6), which is 3.75 MHz, for example. In a non-limiting example, the spectrum chunk 210(2) can include unused spectrum between the discrete channels 202(4)-202(6). The spectrum chunk 210(2) is configured to communicate the digital streams 206(4)-206(6). The spectrum chunk 210(3) includes the discrete channel 202(7) and has a third spectrum chunk bandwidth 212(3) that is greater than or equal to a total bandwidth of the discrete channel 202(7), which is 5 MHz, for example. The spectrum chunk 210(3) is configured to communicate the digital stream 206(7).

To support the spectrum chunks 210(1)-210(3) over the communication link 207 in the example of FIG. 2A, the communication link 207 need only support a bandwidth that is proportional to the aggregated bandwidth of the first spectrum chunk bandwidth 212(1), the second spectrum chunk bandwidth 212(2), and the third spectrum chunk bandwidth 212(3). In this regard, the bandwidth requirement for the communication link 207 in the channel grouping scheme 208 (≥20 MHz) is less than the bandwidth requirement under the conventional channel grouping scheme 200 (43.75 MHz according to the example in FIG. 2A), but more than the bandwidth requirement under the individual channel-based scheme (the aggregated bandwidth of more than 10 MHz according to the example in FIG. 2A). Accordingly, the channel grouping scheme 208 can support a higher aggregated data rate than the individual channel-based scheme, but a lower aggregated data rate than the conventional channel grouping scheme 200. The demand for processing resources at the central unit under the channel grouping scheme 208 will be lower than the conventional channel grouping scheme 200, but higher than the individual channel-based scheme. In contrast, the demand for processing resources at the remote units under the channel grouping scheme 208 will be higher than the conventional channel grouping scheme 200, but lower than the individual channel-based scheme.

To further illustrate implications of the conventional channel grouping scheme 200, the individual channel-based scheme, and the channel grouping scheme 208 on system resource utilization in the context of a WDS, FIGS. 3A-3D are discussed next. Common elements between FIGS. 2A, 2B, and 3A-3D are shown therein with common element numbers and will not be re-described herein.

In this regard, FIG. 3A is a schematic diagram of an exemplary WDS 300 in which a source entity 302 is configured to support the discrete channels 202(1)-202(7) of FIG. 2A according to the individual channel-based scheme. With reference to FIG. 3A, the source entity 302 is configured communicate the digital streams 206(1)-206(7) to a destination entity 304 over a communication link 306. In a first non-limiting example, the source entity 302 is a central unit, and the destination entity 304 is a remote unit in the WDS 300. Accordingly, the communication link 306 is a downlink communication link. Likewise, the discrete channels 202(1)-202(7) are downlink channels, and the digital streams 206(1)-206(7) are downlink digital streams. In a second non-limiting example, the source entity 302 is a remote unit, and the destination entity 304 is a central unit in the WDS 300. Accordingly, the communication link 306 is an uplink communication link. Likewise, the discrete channels 202(1)-202(7) are uplink channels, and the digital streams 206(1)-206(7) are uplink digital streams.

The source entity 302 includes source entity processing resources, which may be implemented by elements such as FPGA, DSP, CPU, etc., for processing the digital streams 206(1)-206(7) associated with the discrete channels 202(1)-202(7). The communication link 306 has a communication link bandwidth for supporting the discrete channels 202(1)-202(7). The destination entity 304 includes destination entity processing resources, which may be implemented by elements such as FPGA, DSP, CPU, etc., for processing the digital streams 206(1)-206(7), which are in-phase (I) and quadrature (Q) (I/Q) samples representing the discrete channels 202(1)-202(7). Collectively, the source entity processing resources, the communication link bandwidth, and the destination entity processing resources are hereinafter referred to as system resources of the WDS 300.

With continuing reference to FIG. 3A, in a non-limiting example, the source entity 302 receives the digital streams 206(1)-206(7) representing the discrete channels 202(1)-202(7) from digital signal source(s) (not shown), such as a BBU, according to common public radio interface (CPRI) protocol or other protocols. Under the individual channel-based scheme, the source entity 302 is configured to communicate the digital streams 206(1)-206(7) individually to the destination entity 304 over the communication link 306. In a non-limiting example, the communication link 306 can be a time-division multiplexing (TDM) link. Accordingly, the digital streams 206(1)-206(7) can be referred to as TDM digital streams 206(1)-206(7). Since the digital streams 206(1)-206(7) are communicated individually, the source entity 302 performs less signal processing on the digital streams 206(1)-206(7). As a result, demand for processing resources is reduced at the source entity 302, as indicated by downward arrow 308. Further, according to previous discussions in FIG. 2A, the communication link bandwidth of the communication link 306 is also reduced, as indicated by downward arrow 310. In contrast to the source entity 302, the destination entity 304 is configured to operate according to the channel grouping scheme 208 of FIG. 2B. As such, the destination entity 304 processes the digital streams 206(1)-206(7) received over the communication link 306 to generate spectrum chunks 210(1)'-210(3)'. According to previous discussions in FIG. 2B, the destination entity 304 needs to perform more signal processing than in the case where the discrete channels 202(1)-202(7) are sent to the destination entity 304 already grouped in the spectrum chunks 210(1)-210(3). As such, demand for processing resources is increased at the destination entity 304, as indicated by upward arrow 312.

FIG. 3B is a schematic diagram of an exemplary WDS 300(1) in which a source entity 302(1) is configured to support the discrete channels 202(1)-202(7) according to the channel grouping scheme 208 of FIG. 2B. With reference to FIG. 3B, the source entity 302(1) is configured communicate the digital streams 206(1)-206(7) to a destination entity 304(1) over a communication link 306(1). In a first non-limiting example, the source entity 302(1) is a central unit, and the destination entity 304(1) is a remote unit in the WDS 300(1). Accordingly, the communication link 306(1) is a downlink communication link. Likewise, the discrete channels 202(1)-202(7) are downlink channels, and the digital streams 206(1)-206(7) are downlink digital streams. In a second non-limiting example, the source entity 302(1) is a remote unit, and the destination entity 304(1) is a central unit in the WDS 300(1). Accordingly, the communication link 306(1) is an uplink communication link. Likewise, the discrete channels 202(1)-202(7) are uplink channels, and the digital streams 206(1)-206(7) are uplink digital streams.

The source entity 302(1) includes source entity processing resources for processing the digital streams 206(1)-206(7) associated with the discrete channels 202(1)-202(7). The communication link 306(1) has a communication link bandwidth for supporting the discrete channels 202(1)-202(7). The destination entity 304(1) includes destination entity processing resources for processing the digital streams 206 (1)-206(7) received in the discrete channels 202(1)-202(7). Collectively, the source entity processing resources, the communication link bandwidth, and the destination entity processing resources are hereinafter referred to as system resources of the WDS 300(1).

With continuing reference to FIG. 3B, under the channel grouping scheme 208, the source entity 302(1) is configured to generate the spectrum chunks 210(1)-210(3) for communicating the digital streams 206(1)-206(7) to the destination entity 304(1) over the communication link 306(1). According to previous discussions in FIG. 2B, the source entity 302(1) needs to group the discrete channels 202(1)-202(7) into the spectrum chunks 210(1)-210(3). As such, demand for processing resources is increased at the source entity 302(1), as indicated by upward arrow 314. Further according to previous discussions in FIG. 2B, the communication link bandwidth of the communication link 306(1) is also increased, as indicated by upward arrow 316. In contrast, the destination entity 304(1) may need to perform less signal processing on the digital streams 206(1)-206(7) in the spectrum chunks 210(1)-210(3) compared to the case where the discrete channels 202(1)-202(7) are sent to the destination entity 304 of FIG. 3A as the discrete channels 202(1)-202(7). As a result, demand for processing resources is decreased at the destination entity 304(1), as indicated by downward arrow 318.

As previously discussed in FIG. 3A, the source entity 302 receives the digital streams 206(1)-206(7) in the discrete channels 202(1)-202(7) from the digital signal source(s). In a non-limiting example, analog streams from analog signal source(s) may also be received. In this regard, FIG. 3C is a schematic diagram of an exemplary WDS 300(2) in which a source entity 302(2) is configured to communicate a plurality of analog streams 320(1)-320(7) in the discrete channels 202(1)-202(7) of FIG. 2A according to the individual channel-based scheme.

With reference to FIG. 3C, the source entity 302(2) receives the analog streams 320(1)-320(7) from the analog signal source(s), such as a base transceiver station (BTS). The source entity 302(2) is configured to first convert the analog streams 320(1)-320(7) into the digital streams 206(1)-206(7), respectively. The source entity 302(2) then communicates the digital streams 206(1)-206(7) to a destination entity 304(2) over a communication link 306(2). In a first non-limiting example, the source entity 302(2) is a central unit, and the destination entity 304(2) is a remote unit in the WDS 300(2). Accordingly, the communication link 306(2) is a downlink communication link. Likewise, the discrete channels 202(1)-202(7) are downlink channels, and the digital streams 206(1)-206(7) are downlink digital streams. In a second non-limiting example, the source entity 302(2) is a remote unit, and the destination entity 304(2) is a central unit in the WDS 300(2). Accordingly, the communication link 306(2) is an uplink communication link. Likewise, the discrete channels 202(1)-202(7) are uplink channels, and the digital streams 206(1)-206(7) are uplink digital streams.

The source entity 302(2) includes source entity processing resources (e.g., FPGA, DSP, CPU, etc.) for processing the analog streams 320(1)-320(7) and the digital streams 206(1)-206(7). The communication link 306(2) has a communication link bandwidth for supporting the discrete channels 202(1)-202(7). The destination entity 304(2) includes destination entity processing resources (e.g., FPGA, DSP, CPU, etc.) for processing the digital streams 206(1)-206(7) received in the discrete channels 202(1)-202(7). Collectively, the source entity processing resources, the communication link bandwidth, and the destination entity processing resources are hereinafter referred to as system resources of the WDS 300(2).

With continuing reference to FIG. 3C, under the individual channel-based scheme, the source entity 302(2) is configured to communicate the digital streams 206(1)-206(7) individually to the destination entity 304(2) over the communication link 306(2). The source entity 302(2) individually converts the analog streams 320(1)-320(7) into the digital streams 206(1)-206(7). Since the source entity 302(2) needs to perform seven analog stream-to-digital stream conversions, demand for processing resources is increased at the source entity 302(2), as indicated by upward arrow 322. According to previous discussions in FIG. 2A, the communication link bandwidth of the communication link 306(2) is reduced, as indicated by downward arrow 324. The destination entity 304(2) is configured to operate according to the channel grouping scheme 208 of FIG. 2B. As such, the destination entity 304(2) processes the digital streams 206(1)-206(7) received over the communication link 306(2) to generate the spectrum chunks 210(1)-210(3). According to previous discussions in FIG. 2B, the destination entity 304(2) performs more signal processing than the source entity 302(2) performs. As such, demand for processing resources is increased at the destination entity 304(2), as indicated by upward arrow 326.

FIG. 3D is a schematic diagram of an exemplary WDS 300(3) in which a source entity 302(3) is configured to communicate the analog streams 320(1)-320(7) of FIG. 3C in the discrete channels 202(1)-202(7) of FIG. 2A according to the channel grouping scheme 208 of FIG. 2B. With reference to FIG. 3D, the source entity 302(3) is configured to first convert the analog streams 320(1)-320(7) into the digital streams 206(1)-206(7), respectively. The source entity 302(3) then communicates the digital streams 206(1)-206(7) to a destination entity 304(3) over a communication link 306(3). In a first non-limiting example, the source entity 302(3) is a central unit, and the destination entity 304(3) is a remote unit in the WDS 300(3). Accordingly, the communication link 306(3) is a downlink communication link. Likewise, the discrete channels 202(1)-202(7) are downlink channels, and the digital streams 206(1)-206(7) are downlink digital streams. In a second non-limiting example, the source entity 302(3) is a remote unit, and the destination entity 304(3) is a central unit in the WDS 300(3). Accordingly, the communication link 306(3) is an uplink communication link. Likewise, the discrete channels 202(1)-202(7) are uplink channels, and the digital streams 206(1)-206(7) are uplink digital streams.

The source entity 302(3) includes source entity processing resources for processing the analog streams 320(1)-320(7) and the digital streams 206(1)-206(7). The destination entity 304(3) includes destination entity processing resources for processing the digital streams 206(1)-206(7). Collectively, the source entity processing resources, the communication link bandwidth, and the destination entity processing resources are hereinafter referred to as system resources of the WDS 300(3).

With continuing reference to FIG. 3D, under the channel grouping scheme 208, the source entity 302(3) is configured to generate the spectrum chunks 210(1)-210(3) for communicating the digital streams 206(1)-206(7) to the destination entity 304(3) over the communication link 306(3). The source entity 302(3) groups the discrete channels 202(1)-202(7) into the spectrum chunks 210(1)-210(3). The source entity 302(3) then assigns the analog streams 320(1)-320(3), the analog streams 320(4)-320(6), and the analog stream 320(7) to the spectrum chunks 210(1)-210(3), respectively. Subsequently, the source entity 302(3) converts the analog streams 320(1)-320(3) into the digital streams 206(1)-206(3), converts the analog streams 320(4)-320(6) into the digital streams 206(4)-206(6), and converts the analog stream 320(7) into the digital stream 206(7). In this regard, the source entity 302(3) only performs three analog stream-to-digital stream conversions, as opposed to the seven analog stream-to-digital stream conversions performed by the source entity 302(2) under the individual channel-based scheme. As such, demand for processing resources is decreased at the source entity 302(3), as indicated by downward arrow 328. Further according to previous discussions in FIG. 2B, the communication link bandwidth of the communication link 306(3) is increased, as indicated by upward arrow 330. The destination entity 304(3) may not perform any further signal processing on the digital streams 206(1)-206(7) in the spectrum chunks 210(1)-210(3). As a result, demand for processing resources is decreased at the destination entity 304(3), as indicated by downward arrow 332.

As previously discussed in FIG. 3A, the source entity 302 and the destination entity 304 are configured to support the discrete channels 202(1)-202(7) according to the individual channel-based scheme and the channel grouping scheme 208, respectively. As a result, the demand for processing resources (e.g., FPGA, DSP, CPU, etc.) decreases at the source entity 302 and increases at the destination entity 304. Concurrently, the demand for communication link bandwidth of the communication link 306 also decreases.

In contrast, as discussed in FIG. 3B, both the source entity 302(1) and the destination entity 304(1) are configured to support the channel grouping scheme 208. As a result, the demand for processing resources increases at the source entity 302(1) and decreases at the destination entity 304(1). Concurrently, the demand for communication link bandwidth of the communication link 306(1) increases.

As such, it may be desired to determine whether to implement the channel grouping scheme 208 at the source entity 302 or the destination entity 304 based on the processing resources available at the source entity 302, the processing resources available at the destination entity 304, and the communication link bandwidth of the communication link 306. In this regard, FIG. 4 is a schematic diagram of an exemplary WDS 400 including a central unit resource configuration system 402 and a plurality of remote unit resource configuration systems 404(1)-404(N) for allocating digital channels associated with communications signals into assigned spectrum chunks in the WDS 400 based on a predefined spectrum-chunking algorithm and a predefined resource allocation policy. The WDS 400 includes a central unit 406 and a plurality of remote units 408(1)-408(N). As is further discussed below, the WDS 400 is configured to allocate the digital channels into the assigned spectrum chunks at the central unit 406 and/or at the remote units 408(1)-408(N) to optimize system resource utilization in the WDS 400, thus providing enhanced overall performance (e.g., designing the WDS 400 for a given throughput with less processing resources, delivering more throughput for a given amount of processing resources, etc.).

With reference to FIG. 4, the WDS 400 may be a DAS with the remote units 408(1)-408(N) provided as remote antenna units, as in this example. In a downlink path 410 in the WDS 400, the central unit 406 is configured to communicate a plurality of downlink digital communications signals 412(1)-412(N) to the remote units 408(1)-408(N) over a plurality of downlink communication links 414(1)-414(N), respectively. The remote units 408(1)-408(N) convert the downlink digital communications signals 412(1)-412(N) into a plurality of downlink RF communications signals 416(1)-416(N) and distribute the downlink RF communications signals 416(1)-416(N) to client devices (not shown) in the WDS 400. In a non-limiting example, the remote units 408(1)-408(N) include one or more frontend circuitries 417(1)-417(N). In a non-limiting example, the frontend circuitries 417(1)-417(N) include analog-to-digital converter (ADC)/digital-to-analog converter (DAC) (ADC/DAC) circuits for converting the downlink digital communications signals 412(1)-412(N) into the downlink RF communications signals 416(1)-416(N). In another non-limiting example, the ADC/DAC circuits convert the downlink digital communications signals 412(1)-412(N) into respective intermediate frequency (IF) signals to be up-converted into the downlink RF communications signals 416(1)-416(N).

In an uplink path 418 of the WDS 400, the remote units 408(1)-408(N) are configured to receive a plurality of uplink RF communications signals 420(1)-420(N) from the client devices in the WDS 400. The remote units 408(1)-408(N) convert the uplink RF communications signals 420(1)-420(N) into a plurality of uplink digital communications signals 422(1)-422(N) and communicate the uplink digital communications signals 422(1)-422(N) to the central unit 406 over a plurality of uplink communication links 424(1)-424(N), respectively.

For the convenience of illustration and discussion, the remote unit 408(1) is discussed hereinafter as a non-limiting example. It shall be appreciated that the configuration and operation principles discussed based on the remote unit 408(1) are applicable to any of the remote units 408(1)-408(N).

With continuing reference to the WDS 400 in FIG. 4, the central unit resource configuration system 402 includes central unit processing circuitry 426. The central unit processing circuitry 426 refers to all processing devices (not shown) in the central unit 406 for processing and communicating the downlink digital communications signals 412(1)-412(N) and the uplink digital communications signals 422(1)-422(N). In a non-limiting example, the central unit processing circuitry 426 includes FPGA(s), DSP(s), and CPU(s). The collective processing capability of the central unit processing circuitry 426 to perform a determined amount of digital processing within a determined time frame is hereinafter referred to as a predefined total central unit processing circuitry resource.

The remote unit resource configuration systems 404(1)-404(N) include a plurality of remote unit processing circuitries 428(1)-428(N), respectively. In this regard, the remote unit 408(1) includes the remote unit processing circuitry 428(1). The remote unit processing circuitry 428(1) refers to all processing devices (not shown) in the remote unit 408(1) for processing and communicating the downlink digital communications signal 412(1) and the uplink digital communications signal 422(1). In a non-limiting example, the remote unit processing circuitry 428(1) includes FPGA(s), DSP(s), and CPU(s). The collective processing capability of the remote unit processing circuitry 428(1) to perform a determined amount of digital processing within a determined time frame is hereinafter referred to as a predefined total remote unit processing circuitry resource.

The downlink communication link 414(1) has a downlink communication link bandwidth, which may be represented by the maximum downlink data rate supported by the downlink communication link 414(1). The uplink communication link 424(1) has an uplink communication link bandwidth, which may be represented by the maximum uplink data rate supported by the uplink communication link 424(1). Collectively, the predefined total central unit processing circuitry resource, the predefined total remote unit processing circuitry resource, the downlink communication link bandwidth, and the uplink communication link bandwidth are hereinafter referred to as system resources of the WDS 400.

In the downlink path 410, the central unit resource configuration system 402 receives a plurality of downlink digital signals 430(1)-430(M). Each of the downlink digital signals 430(1)-430(M) includes one or more discrete downlink channels. As such, the downlink digital signals 430(1)-430(M) correspond to a plurality of discrete downlink channels 432(1)-432(K) conveyed by a plurality of downlink digital streams 434(1)-434(K), respectively. It shall be appreciated that, since each of the downlink digital signals 430(1)-430(M) may include more than one downlink channel, the discrete downlink channels 432(1)-432(K) may outnumber the downlink digital signals 430(1)-430(M) (K≥M). The discrete downlink channels 432(1)-432(K) are assigned to the remote units 408(1)-408(N). Each of the remote units 408(1)-408(N) may be associated with one or more of the discrete downlink channels 432(1)-432(K) and, thus, one or more of the downlink digital streams 434(1)-434(K). In this regard, the central unit resource configuration system 402 may process the downlink digital streams 434(1)-434(K), which convey the discrete downlink channels 432(1)-432(K), and create spectrum chunks, each including one or more of the discrete downlink channels 432(1)-432(K) for communication to the remote units 408(1)-408(N) in respective downlink digital streams.

According to previous discussions in FIG. 3B, the central unit 406 in the WDS 400 in FIG. 4, which could correspond to the source entity 302(1) of FIG. 3B in the downlink path 410, may be configured to communicate the downlink digital streams 434(1)-434(K) of the discrete downlink channels 432(1)-432(K) according to the channel grouping scheme 208. To configure the central unit resource configuration system 402 to communicate the downlink digital streams 434(1)-434(K) according to the channel grouping scheme 208, the WDS 400 further includes a configuration controller 436. The configuration controller 436 is communicatively coupled to the central unit 406 and the remote units 408(1)-408(N). In a non-limiting example, the configuration controller 436 configures the central unit resource configuration system 402 to communicate the downlink digital streams 434(1)-434(K) according to the channel grouping scheme 208 when the configuration controller 436 determines that the predefined total central unit processing circuitry resource of the central unit processing circuitry 426 is underutilized. Otherwise, the configuration controller 436 may configure the central unit processing circuitry 426 to communicate the downlink digital streams 434(1)-434(K) according to the individual channel-based scheme.

The configuration controller 436 configures the central unit resource configuration system 402 to perform the channel grouping scheme 208 and/or the individual channel-based scheme according to a predefined resource allocation policy. In a non-limiting example, the configuration controller 436 retrieves the predefined resource allocation policy from a resource allocation policy database 438, which is communicatively coupled to the configuration controller 436.

With continuing reference to FIG. 4, in the uplink path 418, the remote unit 408(1) receives the uplink RF communications signal 420(1). The frontend circuitry 417(1) converts the uplink RF communications signal 420(1) into a plurality of uplink digital signals 439(1)-439(P). Each of the uplink digital signals 439(1)-439(P) includes one or more discrete uplink channels. As such, the uplink digital signals 439(1)-439(P) correspond to a plurality of discrete uplink channels 440(1)-440(K) conveyed in a plurality of uplink digital streams 442(1)-442(K), respectively. It shall be appreciated that, since each of the uplink digital signals 439(1)-439(P) may include more than one uplink channel, the discrete uplink channels 440(1)-440(K) may outnumber the uplink digital signals 439(1)-439(P) (K≥P).

According to previous discussions in FIG. 3B, the remote unit 408(1), which corresponds to the source entity 302(1) of FIG. 3B in the uplink path 418, may be configured to communicate the uplink digital streams 442(1)-442(K) in the discrete uplink channels 440(1)-440(K) according to the channel grouping scheme 208. The remote unit 408(1) is communicatively coupled to the configuration controller 436. The configuration controller 436 configures the remote unit resource configuration system 404(1) to communicate the uplink digital streams 442(1)-442(K) according to the channel grouping scheme 208 when the configuration controller 436 determines that the predefined total remote unit processing circuitry resource of the remote unit processing circuitry 428(1) is underutilized. Otherwise, the configuration controller 436 may configure the remote unit processing circuitry 428(1) to communicate the uplink digital streams 442(1)-442(K) according to the individual channel-based scheme.

Figure 5:
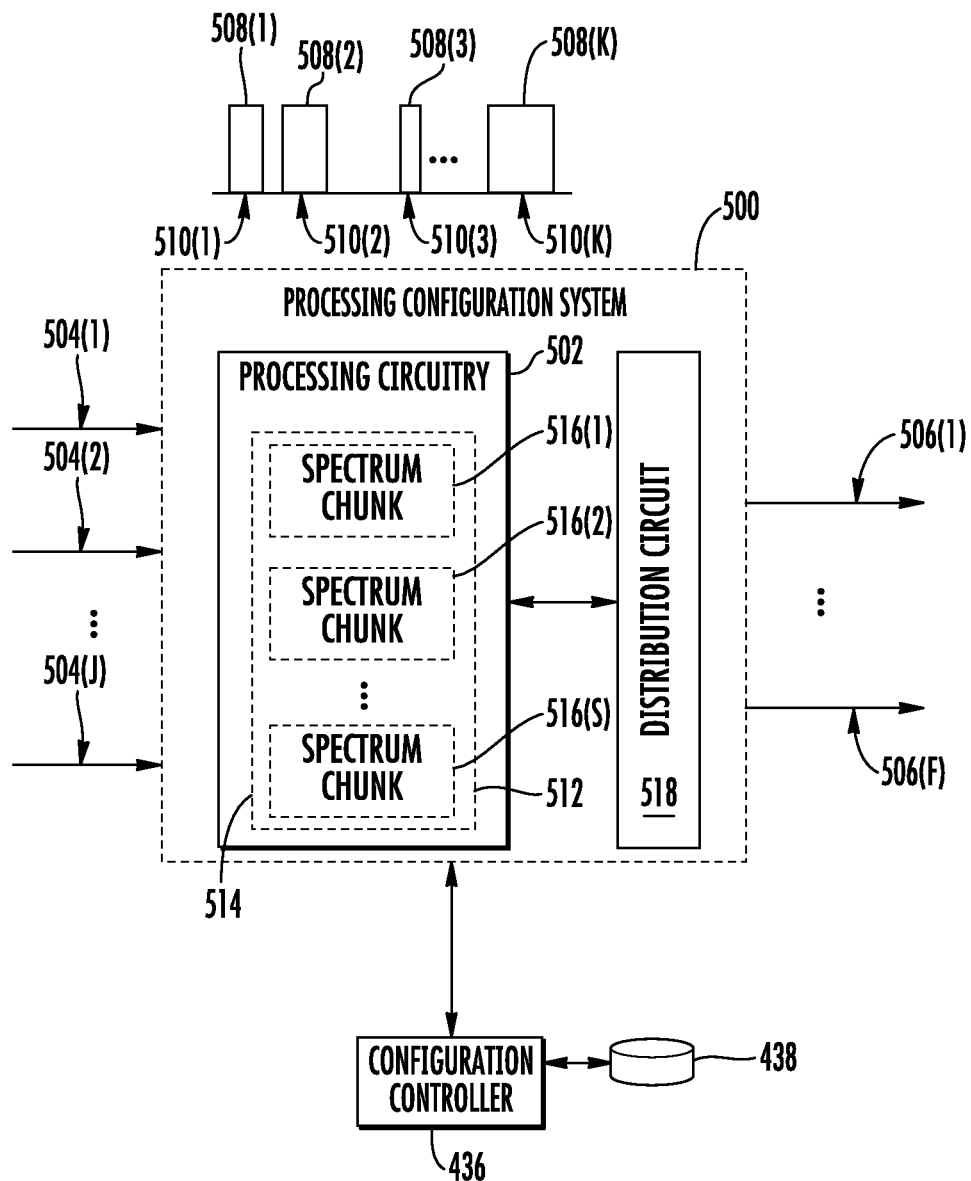
FIG. 5 is a schematic diagram of an exemplary resource configuration system that can be configured to function as the central unit resource configuration system and/or the remote unit resource configuration systems in the WDS of FIG. 4.

The central unit resource configuration system 402 and the remote unit resource configuration system 404(1) can be configured based on a common architecture. In this regard, FIG. 5 is a schematic diagram of an exemplary resource configuration system 500 that can be provided in the central unit 406 of FIG. 4 as the central unit resource configuration system 402 and/or in the remote units 408(1)-408(N) as the remote unit resource configuration systems 404(1)-404(N). Common elements between FIGS. 4 and 5 are shown therein with common element numbers and will not be re-described herein.

With reference to FIG. 5, the resource configuration system 500 includes processing circuitry 502. The processing circuitry 502 has a predefined total processing circuitry resource. When the resource configuration system 500 is provided in the central unit 406 as the central unit resource configuration system 402, the predefined total processing circuitry resource is equivalent to the predefined total central unit processing circuitry resource. Likewise, when the resource configuration system 500 is provided in the remote unit 408(1) as the remote unit resource configuration system 404(1), the predefined total processing circuitry resource is equivalent to the predefined total remote unit processing circuitry resources.

The processing circuitry 502 in the resource configuration system 500 is configured to receive a plurality of incoming digital signals 504(1)-504(J) and provide a plurality of outgoing digital signals 506(1)-506(F). In a non-limiting example, the incoming digital signals 504(1)-504(J) can each include one or more discrete channels, such as the discrete channels 202(1)-202(7) of FIG. 3A, for example. When the resource configuration system 500 is provided in the central unit 406 as the central unit resource configuration system 402, the incoming digital signals 504(1)-504(J) are equivalent to the downlink digital signals 430(1)-430(M), and the outgoing digital signals 506(1)-506(F) are equivalent to the downlink digital communications signals 412(1)-412(N). When the resource configuration system 500 is provided in the remote unit 408(1) as the remote unit resource configuration system 404(1), the incoming digital signals 504(1)-504(J) are equivalent to the uplink digital signals 439(1)-439(P), and the outgoing digital signals 506(1)-506(F) are equivalent to the uplink digital communications signals 422(1)-422(N).

With continuing reference to FIG. 5, the incoming digital signals 504(1)-504(J) include a plurality of discrete channels 508(1)-508(K), wherein the letter K may represent a different positive integer from the letter K in FIG. 4. The discrete channels 508(1)-508(K) are configured to be communicated in a plurality of digital streams 510(1)-510(K), respectively. In a non-limiting example, the discrete channels 508(1)-508(2) each have a 5 MHz bandwidth, the discrete channel 508(3) has a 1.25 MHz bandwidth, and the discrete channel 508(K) has a 10 MHz bandwidth. When the resource configuration system 500 is provided as the central unit resource configuration system 402 in the central unit 406, the discrete channels 508(1)-508(K) are equivalent to the discrete downlink channels 432(1)-432(K), and the digital streams 510(1)-510(K) are equivalent to the downlink digital streams 434(1)-434(K). Likewise, when the resource configuration system 500 is provided in the remote units 408(1), the discrete channels 508(1)-508(K) are equivalent to the discrete uplink channels 440(1)-440(K), and the digital streams 510(1)-510(K) are equivalent to the uplink digital streams 442(1)-442(K).

The processing circuitry 502 includes a memory 512 configured to store a spectrum chunk map 514 in a storage media (not shown) for example. The spectrum chunk map 514 includes one or more spectrum chunks 516(1)-516(S). In a non-limiting example, the spectrum chunk map 514 is determined by an algorithm that defines the spectrum chunks 516(1)-516(S) based on channel location, bandwidth and resource availability, and other factors. The configuration controller 436 determines how the discrete channels 508(1)-508(K) are grouped into the spectrum chunks 516(1)-516(S) using the algorithm for defining the spectrum chunks 516(1)-516(S) in the spectrum chunk map 514. When the processing circuitry 502 is provided in the central unit resource configuration system 402, the spectrum chunk map 514 is referred to as a downlink spectrum chunk map 514 and the spectrum chunks 516(1)-516(S) are referred to as one or more downlink spectrum chunks 516(1)-516(S). When the processing circuitry 502 is provided in the remote unit resource configuration system 404(1), the spectrum chunk map 514 is referred to as an uplink spectrum chunk map 514 and the spectrum chunks 516(1)-516(S) are referred to as one or more uplink spectrum chunks 516(1)-516(S). Each of the spectrum chunks 516(1)-516(S) is assigned with at least one discrete channel among the discrete channels 508(1)-508(K) according to the spectrum chunk map 514. For example, the spectrum chunk map 514 assigns the discrete channels 508(1)-508(2) to the spectrum chunk 516(1), and assigns the discrete channel 508(K) to the spectrum chunk 516(S). Each of the spectrum chunks 516(1)-516(S) are allocated a processing circuitry resource that is less than or equal to the predefined total processing circuitry resource of the processing circuitry 502. In a non-limiting example, configuration settings of the processing circuitry resource (e.g., FPGA, DSP, CPU, etc.) for processing the spectrum chunks 516(1)-516(S) include digital up conversion, digital down-conversion, filtering, digital signal combining, etc.

The processing circuitry 502 receives the incoming digital signals 504(1)-504(J). In this regard, the incoming digital signals 504(1)-504(J) may each include an in-phase (I) component (I-component) and a quadrature (Q) component (Q-component). Likewise, the outgoing digital signals 506(1)-506(F) also may each include an I-component and a Q-component.

The processing circuitry 502 is configured to allocate each of the discrete channels 508(1)-508(K) to the assigned spectrum chunk based on the spectrum chunk map 514. For example, the spectrum chunk map 514 assigns the discrete channels 508(1)-508(2) to the spectrum chunk 516(1). Therefore, the processing circuitry 502 allocates the discrete channels 508(1)-508(2) to the spectrum chunk 516(1) based on the spectrum chunk map 514. The processing circuitry 502 is further configured to process each of the spectrum chunks 516(1)-516(S) based on the processing circuitry resource allocated to the spectrum chunk 516(1)-516(S). The usage of the processing circuitry resource is determined based on system analysis of required channels that need to be routed to the remote unit 408(1) versus available processing resources at the central unit 406 and the remote unit 408(1), as well as available bandwidth in the downlink communication links 414(1) and/or the uplink communication link 424(1). In a non-limiting example, the discrete channels 508(1)-508(K) are provided to the remote unit 408(1) based on the conventional channel grouping scheme 200 of FIG. 2A, and the predefined total remote unit processing circuitry resources of the remote unit 408(1) are fully utilized. As such, if additional discrete channels need to be added to the remote unit 408(1), the remote unit resource configuration system 404(1) in the remote unit 408(1) will not be able to perform required signal processing for the additional discrete channels. Hence, the central unit resource configuration system 402 can bundle the discrete channels 508(1)-508(K) into the downlink spectrum chunks 516(1)-516(S) and provide the downlink spectrum chunks 516(1)-516(S) to the remote unit 408(1). As a result, the remote unit 408(1) will process a reduced number of the discrete channels 508(1)-508(K), thus freeing digital processing resources for processing the additional discrete channels. By assigning the predefined total remote unit processing circuitry resource to the spectrum chunks 516(1)-516(S), it is possible to avoid underutilization or overutilization of the predefined total processing circuitry resource of the processing circuitry 502, thus optimizing resource utilization in the processing circuitry 502.

The resource configuration system 500 also includes a distribution circuit 518. In a non-limiting example, the distribution circuit 518 is a constructor/de-constructor circuit. The distribution circuit 518 is configured to generate the outgoing digital signals 506(1)-506(F). In a non-limiting example, the distribution circuit 518 assigns at least one spectrum chunk among the spectrum chunks 516(1)-516(S) to each of the outgoing digital signals 506(1)-506(F).

The resource configuration system 500 is configured to optimize resource utilization in the processing circuitry 502 based on a processing circuitry resource allocation process. In this regard, FIG. 6 is a flowchart of an exemplary process 600 of the resource configuration system 500 of FIG. 5 for allocating processing resources.

Figure 6:
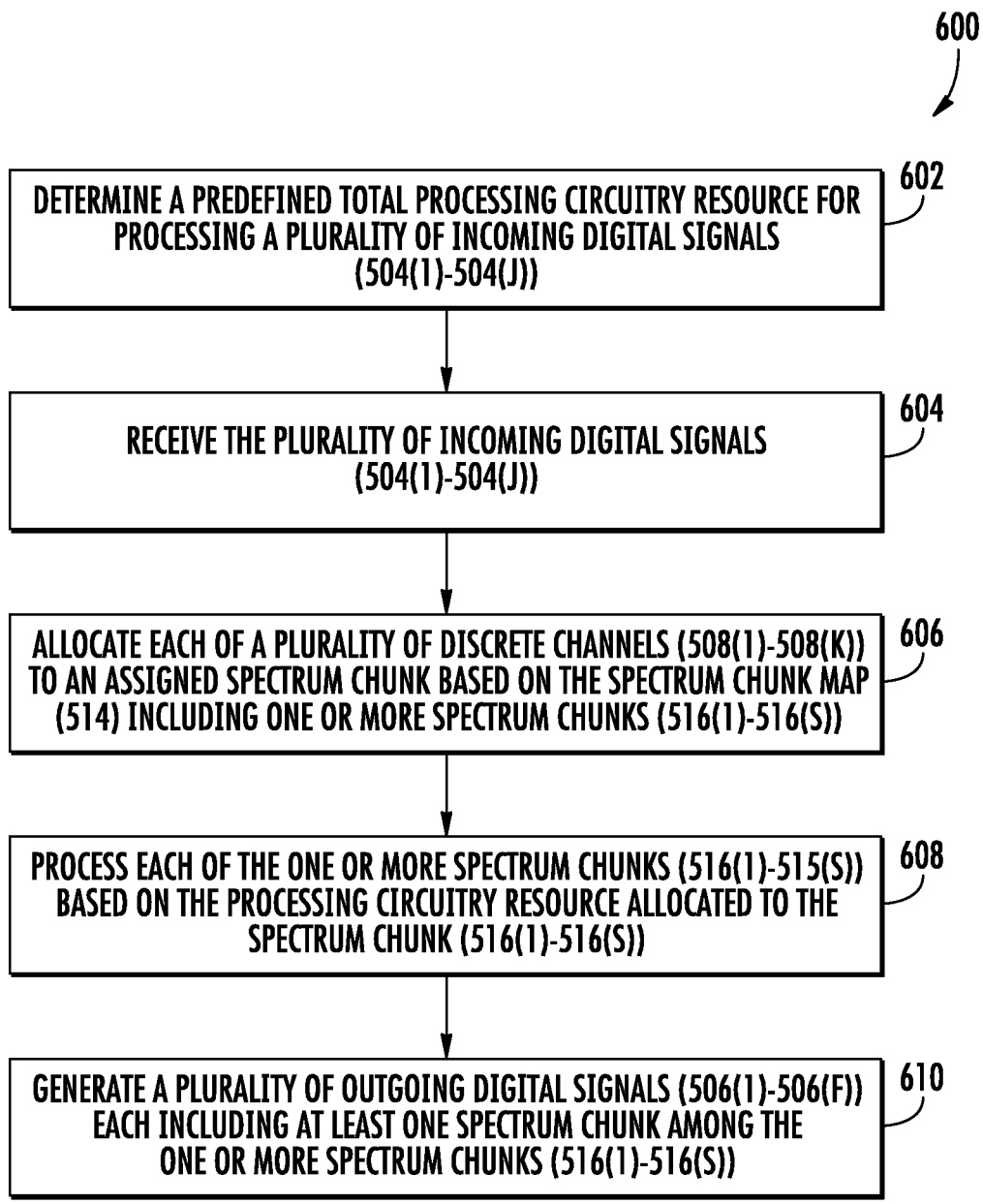
FIG. 6 is a flowchart of an exemplary process of the resource configuration system of FIG. 5 for allocating processing resources.

With reference to FIG. 6, the processing circuitry resource allocation process 600 begins with determining the predefined total processing circuitry resource for processing the incoming digital signals 504(1)-504(J) (block 602). In a non-limiting example, the predefined total processing circuitry resource of the processing circuitry is determined based on specifications of processing components such as FPGA, DSP, CPU, etc. As previously discussed in FIG. 5, the incoming digital signals 504(1)-504(J) include the digital streams 510(1)-510(K) conveying the discrete channels 508(1)-508(K). The processing circuitry 502 receives the incoming digital signals 504(1)-504(J) (block 604). The processing circuitry 502 then allocates each of the discrete channels 508(1)-508(K) to an assigned spectrum chunk based on a spectrum chunk map 514 that includes the spectrum chunks 516(1)-516(S) (block 606). According to previous discussions in FIG. 5, each of the spectrum chunks 516(1)-516(S) is assigned with at least one discrete channel among the discrete channels 508(1)-508(K). Further according to previous discussions in FIG. 5, each of the spectrum chunks 516(1)-516(S) is allocated a processing circuitry resource that is less than or equal to the predefined total processing circuitry resource of the processing circuitry 502.

The processing circuitry 502 processes each of the spectrum chunks 516(1)-516(S) based on the processing circuitry resource allocated to the spectrum chunk 516(1)-516(S) (block 608). The distribution circuit 518 then generates the outgoing digital signals 506(1)-506(F), wherein each of the outgoing digital signals 506(1)-506(F) includes at least one spectrum chunk among the spectrum chunks 516(1)-516(S) (block 610). In a non-limiting example, the at least one spectrum chunk included in each of the outgoing digital signals 506(1)-506(F) are determined by the configuration controller 436 and stored in the memory 512. In another non-limiting example, the configuration controller 436 determines the at least one spectrum chunk to be included in each of the outgoing digital signals 506(1)-506(F) based on the wireless services provided by the remote unit 408(1) of FIG. 4.

With reference back to FIG. 4, in the downlink path 410, the resource configuration system 500 of FIG. 5 is provided in the central unit 406 to function as the central unit resource configuration system 402. As such, according to previous discussions in FIG. 5, the central unit resource configuration system 402 includes the processing circuitry 502 of FIG. 5. Accordingly, the processing circuitry 502 in the central unit resource configuration system 402 provides a predefined total central unit processing circuitry resource, which is equivalent to the processing circuitry resource as discussed in FIG. 5, for processing the downlink digital signals 430(1)-430(M) that include the discrete downlink channels 432(1)-432(K). The processing circuitry 502 in the central unit resource configuration system 402 includes the spectrum chunk map 514 of FIG. 5, which is referred to as the downlink spectrum chunk map 514 in context of the central unit 406, stored in the memory 512. The downlink spectrum chunk map 514 includes the spectrum chunks 516(1)-516(S) of FIG. 5 that are referred to as the downlink spectrum chunks 516(1)-516(S) in the context of the central unit 406. The central unit resource configuration system 402 also includes the distribution circuit 518 of FIG. 5.

The configuration controller 436 determines the downlink spectrum chunk map 514 for the central unit resource configuration system 402 based on the predefined spectrum-chunking algorithm. The configuration controller 436 assigns at least one discrete downlink channel among the discrete downlink channels 432(1)-432(K) to each of the downlink spectrum chunks 516(1)-516(S). The configuration controller 436 allocates a central unit processing circuitry resource that is less than or equal to the predefined total central unit processing circuitry resource in the central unit resource configuration system 402 to each of the downlink spectrum chunks 516(1)-516(S). In this regard, when the central unit resource configuration system 402 receives the downlink digital signals 430(1)-430(M), the central unit resource configuration system 402 allocates each of the discrete downlink channels 432(1)-432(K) to an assigned downlink spectrum chunk based on the downlink spectrum chunk map 514. The processing circuitry 502 in the central unit resource configuration system 402 processes each of the downlink spectrum chunks 516(1)-516(S) based on the central unit processing circuitry resource allocated to the downlink spectrum chunk. The distribution circuit 518 in the central unit resource configuration system 402 generates the downlink digital communications signals 412(1)-412(N). Each of the downlink digital communications signals 412(1)-412(N) includes at least one of the downlink spectrum chunks 516(1)-516(S).

As discussed above, the configuration controller 436 determines the downlink spectrum chunk map 514 for the central unit resource configuration system 402 based on the predefined spectrum-chunking algorithm. In this regard, FIG. 7 is a schematic diagram of an exemplary spectrum-chunking engine 700 that is employed by the configuration controller 436 of FIG. 4 to implement the predefined spectrum-chunking algorithm for allocating the digital channels associated with the communications signals into the spectrum chunks.

Figure 7:
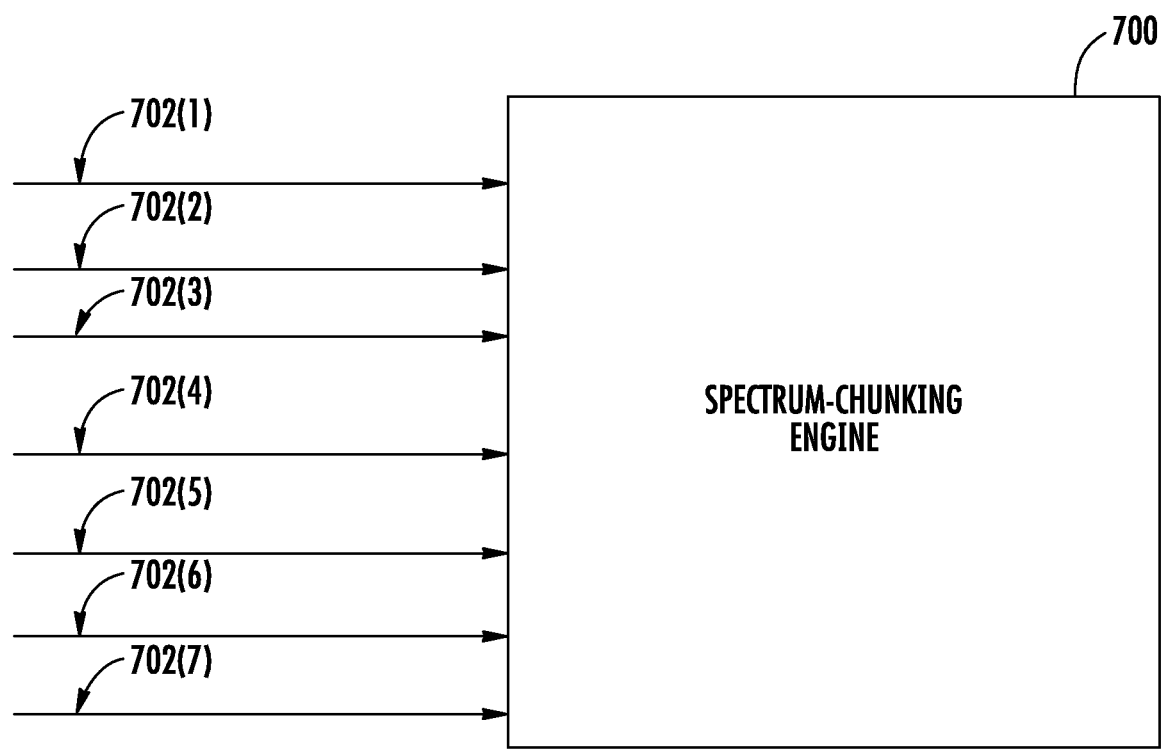
FIG. 7 is a schematic diagram of an exemplary spectrum-chunking engine that is employed by an exemplary configuration controller in the WDS of FIG. 4 to implement the predefined spectrum-chunking algorithm for allocating the digital channels associated with the communications signals into the spectrum chunks of FIG. 4.

With reference to FIG. 7, the spectrum-chunking engine 700 may be provided in a microprocessor or a microcontroller (not shown), for example. In a non-limiting example, the predefined spectrum-chunking algorithm includes a set of predefined tests stored in a storage media (e.g., memory) or in the resource allocation policy database 438 of FIG. 4. The spectrum-chunking engine 700 determines how the discrete channels 508(1)-508(K) of FIG. 5 will be grouped to the spectrum chunks 516(1)-516(S) in the spectrum chunk map 514. In a non-limiting example, the spectrum-chunking engine 700 determines how the discrete channels 508(1)-508(K) are grouped into the spectrum chunks 516(1)-516(S) using the same algorithm for defining the spectrum chunks 516(1)-516(S) in the spectrum chunk map 514. The spectrum-chunking engine 700 also determines allocation of the predefined processing circuitry resource of FIG. 5 to the spectrum chunks 516(1)-516(S). In addition, the spectrum-chunking engine 700 may also be configured to determine a graceful degradation scheme, which involves reducing the number of bits in the downlink digital streams 434(1)-434(K) and the uplink digital streams 442(1)-442(K) of FIG. 4 to ease bandwidth requirement on the downlink communication links 414(1)-414(N) and the uplink communication links 424(1)-424(N).

As mentioned above, the predefined spectrum-chunking algorithm may optionally include the set of predefined tests. In a non-limiting example, the predefined spectrum-chunking algorithm includes a plurality of tests 702(1)-702(7). The test 702(1) is set to determine the frequencies and bandwidths of the downlink communication links 414(1)-414(N) and the uplink communication links 424(1)-424(N). The test 702(2) is set to determine whether the predefined total central unit processing circuitry resource and the predefined total remote unit processing circuitry resource is overutilized or underutilized. In other words, the test 702(2) is set to determine resource availability in the central unit 406 and the remote unit 408(1) of FIG. 4. The test 702(3) is set to determine maximum data rates of the downlink communication links 414(1)-414(N) and the uplink communication links 424(1)-424(N). The test 702(4) is set to determine which of the discrete downlink channels 432(1)-432(K) and the discrete uplink channels 440(1)-440(K) cannot be assigned to the spectrum chunks 516(1)-516(S). The test 702(5) is set to determine which of the discrete downlink channels 432(1)-432(K) and the discrete uplink channels 440(1)-440(K) can tolerate the graceful degradation scheme, as discussed above. The test 702(6) is set to check the predefined resource allocation policy stored in the resource allocation policy database 438. The test 702(7) is set to determine a capacity distribution scheme, which may be derived from the predefined resource allocation policy.

To further illustrate the predefined resource allocation policy that is relevant to the tests 702(6)-702(7), FIG. 8 is a table 800 providing an exemplary illustration of the predefined resource allocation policy of FIG. 4 that the configuration controller 436 can use to configure the central unit resource configuration system 402 and the remote unit resource configuration systems 404(1)-404(N) for optimizing system resource utilization in the WDS 400 of FIG. 4.

Common elements between FIGS. 4 and 8 are shown therein with common element numbers and will not be re-described herein.

With reference to FIG. 8, the table 800, which defines a data structure for storing the predefined resource allocation policy in the resource allocation policy database 438, includes a first column 802, a second column 804, and a third column 806. The first column 802 provides communications link identifiers. The second column 804 lists frequency channels occupied by a communications signal (e.g., the downlink digital communications signal 412(1) or the uplink digital communications signal 422(1)). The third column 806 includes the predefined resource allocation policy.

The table 800 includes a plurality of rows 808(1)-808(M), each corresponding to a respective communications link among the downlink communication links 414(1)-414(N) and the uplink communication links 424(1)-424(N), Link 1-Link M in this example, configured to communicate the downlink digital communications signals 412(1)-412(N) and the uplink digital communications signals 422(1)-422(N). For example, the row 808(1) corresponds to the downlink communication link 414(1). In the row 808(1), the second column 804 indicates that the downlink digital communications signal 412(1) occupies channels 642, 435, 455, 342, and 550. The third column 806 includes the predefined resource allocation policies for the downlink communication link 414(1). In a non-limiting example, two predefined resource allocation policies are defined for the downlink communication link 414(1). First, channel 642 is eliminated from the downlink digital communications signal 412(1) if the downlink communication link 414(1) does not have sufficient bandwidth to communicate the downlink digital communications signal 412(1). Next, if the downlink communication link 414(1) is still unable to provide sufficient bandwidth to support the downlink digital communications signal 412(1), channel 455 is further eliminated from the downlink communication link 414(1).

With continuing reference to FIG. 8, the predefined resource allocation policies may vary between different communications links among the downlink communication links 414(1)-414(N) and the uplink communication links 424(1)-424(N). In another non-limiting example, the third column 806 in the row 808(2) defines that, if Link 2 is unable to provide a required capacity (e.g., data throughput), one of the multiple-input multiple-output (MIMO) streams associated with channel 442 is omitted. If Link 2 is still unable to provide the required capacity, one of the MIMO streams associated with channel 485 is further omitted.

In another non-limiting example, the third column 806 in the row 808(3) defines that, if Link 3 is unable to provide a required capacity, then an activate compression algorithm will be applied on in-phase (I) and quadrature (Q) (I/Q) samples communicated on channels 440 and 480. In another non-limiting example, the third column 806 in the row 808(M) defines that, if Link M is unable to provide a required capacity, then the number of bits used for the downlink digital communications signal 412(1) or the uplink digital communications signal 422(1) is reduced (e.g., reducing the number of bits from fourteen (14) bits to ten (10) bits). If Link M is still unable to provide the required capacity, then channel 410 is eliminated.

With reference back to FIG. 4, in the downlink path 410, in one non-limiting example, the central unit resource configuration system 402 receives one or more downlink digital signals 430(1)-430(L) among the downlink digital signals 430(1)-430(M), wherein L≤M, from one or more digital signal sources 444(1)-444(L). In a non-limiting example, the digital signal sources 444(1)-444(L) are BBUs, and the downlink digital signals 430(1)-430(L) are based on a CPRI communication protocol. In another non-limiting example, the central unit 406 includes at least one central unit ADC/DAC circuit 446. The central unit ADC/DAC circuit 446 receives one or more downlink analog signals 448(1)-448(G) from one or more analog signal sources 450(1)-450(G). In a non-limiting example, the analog signal sources 450(1)-450(G) are base transceiver stations (BTSs). The central unit ADC/DAC circuit 446 converts the downlink analog signals 448(1)-448(G) into the downlink digital signals 430(L+1)-430(M) among the downlink digital signals 430(1)-430(M). The central unit resource configuration system 402 receives the downlink digital signals 430(L+1)-430(M) from the central unit ADC/DAC circuit 446. It shall be appreciated that the central unit resource configuration system 402 may receive the downlink digital signals 430(1)-430(L), the downlink analog signals 448(1)-448(G), or a combination of the downlink digital signals 430(1)-430(L) and the downlink analog signals 448(1)-448(G).

With continuing reference to FIG. 4, the remote unit 408(1) receives the downlink digital communications signal 412(1) from the central unit 406 over the downlink communication link 414(1). As previously discussed, the downlink digital communications signal 412(1) may include at least one downlink spectrum chunk among the downlink spectrum chunks 516(1)-516(S) in the downlink spectrum chunk map 514, and the at least one downlink spectrum chunk is assigned at least one discrete downlink channel among the discrete downlink channels 432(1)-432(K). As such, the remote unit 408(1) is configured to process the at least one downlink spectrum chunk received in the downlink digital communications signal 412(1).

In this regard, FIG. 9A is a schematic diagram providing an exemplary illustration of the remote unit 408(1) among the remote units 408(1)-408(N) in the WDS 400 of FIG. 4 configured to process the downlink digital communications signal 412(1) among the downlink digital communications signals 412(1)-412(N) received from the central unit 406. Common elements between FIGS. 4 and 9A are shown therein with common element numbers and will not be re-described herein.

With reference to FIG. 9A, in a non-limiting example, the downlink digital communications signal 412(1) includes at least one first downlink spectrum chunk 900(1), at least one second downlink spectrum chunk 900(2), and at least one third downlink spectrum chunk 900(3). The first downlink spectrum chunk 900(1) includes a first discrete downlink channel 904(1) and a second discrete downlink channel 904(2). The first discrete downlink channel 904(1) and the second discrete downlink channel 904(2) provide a first remote unit downlink digital signal 906(1) and a second remote unit downlink digital signal 906(2), respectively. The first discrete downlink channel 904(1) and the second discrete downlink channel 904(2) are already positioned at a predefined frequency 908, which is equal to zero (0), for example. As such, when the remote unit 408(1) determines that the first discrete downlink channel 904(1) and the second discrete downlink channel 904(2) are already positioned at the predefined frequency 908, at least one first DAC 910(1) in the remote unit 408(1) is configured to convert the first remote unit downlink digital signal 906(1) and the second remote unit downlink digital signal 906(2) to generate a first downlink RF signal 912(1). At least one first analog mixer 914(1) is configured to frequency shift the first downlink RF signal 912(1) to a first carrier frequency $f_1$. At least one first bandpass filter 916(1) is configured to reduce out-of-channel emissions in the first downlink RF signal 912(1) that fall outside the first discrete downlink channel 904(1) and the second discrete downlink channel 904(2).

With continuing reference to FIG. 9A, the second downlink spectrum chunk 900(2) includes a third discrete downlink channel 904(3) that provides a third remote unit downlink digital signal 906(3). The third downlink spectrum chunk 900(3) includes a fourth discrete downlink channel 904(4) that provides a fourth remote unit downlink digital signal 906(4). Unlike the first discrete downlink channel 904(1) and the second discrete downlink channel 904(2), the third discrete downlink channel 904(3) and the fourth discrete downlink channel 904(4) are not positioned at the predefined frequency 908. As such, when the remote unit 408(1) determines that the third discrete downlink channel 904(3) and the fourth discrete downlink channel 904(4) are not positioned at the predefined frequency 908, the remote unit 408(1) is configured to shift the third discrete downlink channel 904(3) and the fourth discrete downlink channel 904(4) to the predefined frequency 908.

In this regard, the remote unit 408(1) includes a first digital up-converter (DUC) 918(1) and a second DUC 918(2). The first DUC 918(1) is configured to shift the third discrete downlink channel 904(3) to the predefined frequency 908. The second DUC 918(2) is configured to shift the fourth discrete downlink channel 904(4) to the predefined frequency 908. At least one digital combiner 920 is configured to combine the third remote unit downlink digital signal 906(3) and the fourth remote unit downlink digital signal 906(4) to generate at least one combined remote unit downlink digital signal 922, which occupies both the third discrete downlink channel 904(3) and the fourth discrete downlink channel 904(4). The remote unit 408(1) includes at least one second DAC 910(2) configured to convert the combined remote unit downlink digital signal 922 to generate a second downlink RF signal 912(2). At least one second analog mixer 914(2) is configured to frequency shift the second downlink RF signal 912(2) to a second carrier frequency $f_2$. At least one second bandpass filter 916(2) is configured to reduce out-of-channel emissions in the second downlink RF signal 912(2) that fall outside the third discrete downlink channel 904(3) and the fourth discrete downlink channel 904(4). In a non-limiting example, the first downlink RF signal 912(1) and the second downlink RF signal 912(2) are included in the downlink RF communications signal 416(1).

With continuing reference to FIG. 9A, each of the first remote unit downlink digital signal 906(1), the second remote unit downlink digital signal 906(2), the third remote unit downlink digital signal 906(3), and the fourth remote unit downlink digital signal 906(4) may include an I-component and a Q-component. In this regard, the first DAC 910(1) is configured to convert the first remote unit downlink digital signal 906(1) and the second remote unit downlink digital signal 906(2) into the first downlink RF signal 912(1) by converting separately the I-components and the Q-components of the first remote unit downlink digital signal 906(1) and the second remote unit downlink digital signal 906(2). Likewise, the second DAC 910(2) is configured to convert the third remote unit downlink digital signal 906(3) and the fourth remote unit downlink digital signal 906(4) into the second downlink RF signal 912(2) by converting separately the I-components and the Q-components of the third remote unit downlink digital signal 906(3) and the fourth remote unit downlink digital signal 906(4). Similarly, the first DUC 918(1) is configured to shift the I-component and the Q-component of the third remote unit downlink digital signal 906(3) in the third discrete downlink channel 904(3) separately. Likewise, the second DUC 918(2) is configured to shift the I-component and the Q-component of the fourth remote unit downlink digital signal 906(4) in the fourth discrete downlink channel 904(4) separately.

In a non-limiting example, the first analog mixer 914(1) and the second analog mixer 914(2) are analog I/Q de-modulators. In this regard, FIG. 9B is a schematic diagram of an exemplary analog I/Q de-modulator 924 that can be provided in the remote unit 408(1) of FIG. 9A. Common elements between FIGS. 4, 9A and 9B are shown therein with common element numbers and will not be re-described herein.

With reference to FIG. 9B, the analog I/Q de-modulator 924 can be provided in the remote unit 408(1) of FIG. 9A as the first analog mixer 914(1) and/or the second analog mixer 914(2). The analog I/Q de-modulator 924 includes an I-signal mixer 926 and a Q-signal mixer 928. The analog I/Q de-modulator 924 receives the first downlink RF signal 912(1) and/or the second downlink RF signal 912(2) that includes an I-signal 930 and a Q-signal 932. The I-signal mixer 926 and the Q-signal mixer 928 shift the I-signal 930 and the Q-signal 932, respectively, to a carrier frequency (e.g., the first carrier frequency $f_1$ or the second carrier frequency $f_2$ of FIG. 9A) based on an oscillator 934. A combiner 936 combines the I-signal 930 and the Q-signal 932 to generate the first downlink RF signal 912(1) at the first carrier frequency $f_1$ and/or the second downlink RF signal 912(2) at the second carrier frequency $f_2$.

With reference back to FIG. 4, in the uplink path 418, the resource configuration system 500 of FIG. 5 is provided in the remote unit 408(1) to function as the remote unit resource configuration system 404(1). As such, according to previous discussions in FIG. 5, the remote unit resource configuration system 404(1) includes the processing circuitry 502 of FIG. 5. Accordingly, the processing circuitry 502 in the remote unit resource configuration system 404(1) provides the predefined total remote unit processing circuitry resource, which is equivalent to the processing circuitry resource as discussed in FIG. 5, for processing the uplink digital signals 439(1)-439(P) that include the discrete uplink channels 440(1)-440(K). In a non-limiting example, it is possible to allocate separate processing resources (e.g., via a second FPGA, DSP, CPU, etc.) in the remote unit 408(1) for processing the uplink digital signals 439(1)-439(P). In this regard, the predefined total remote unit processing circuitry resource of the remote unit 408(1) includes a remote unit downlink processing circuitry resource and a remote unit uplink processing circuitry resource. The processing circuitry 502 in the remote unit resource configuration system 404(1) includes the spectrum chunk map 514 of FIG. 5, which is referred to as the uplink spectrum chunk map 514 in context of the remote unit 408(1), stored in the memory 512. The uplink spectrum chunk map 514 includes the spectrum chunks 516(1)-516(S) of FIG. 5 that are referred to as the uplink spectrum chunks 516(1)-516(S) in the context of the remote unit 408(1). The remote unit resource configuration system 404(1) also includes the distribution circuit 518 of FIG. 5 for generating the uplink digital communications signal 422(1).

The configuration controller 436 determines the uplink spectrum chunk map 514 for the remote unit resource configuration system 404(1) based on the predefined spectrum-chunking algorithm. The configuration controller 436 assigns at least one discrete uplink channel among the discrete uplink channels 440(1)-440(K) to each of the uplink spectrum chunks 516(1)-516(S). The configuration controller 436 allocates a remote unit processing circuitry resource that is less than or equal to the predefined total remote unit processing circuitry resource in the remote unit resource configuration system 404(1) to each of the uplink spectrum chunks 516(1)-516(S). In this regard, when the remote unit resource configuration system 404(1) receives the uplink digital signals 439(1)-439(P), the remote unit resource configuration system 404(1) allocates each of the discrete uplink channels 440(1)-440(K) to an assigned uplink spectrum chunk based on the uplink spectrum chunk map 514. The processing circuitry 502 in the remote unit resource configuration system 404(1) processes each of the uplink spectrum chunks 516(1)-516(S) based on the remote unit processing circuitry resource allocated to the uplink spectrum chunk. The distribution circuit 518 in the remote unit resource configuration system 404(1) generates the uplink digital communications signal 422(1). The uplink digital communications signals 422(1) includes one or more of the spectrum chunks 516(1)-516(S).

With continuing reference to FIG. 4, the remote unit 408(1) generates the uplink digital communications signal 422(1) based on the uplink RF communications signal 420(1) received from the client devices. In this regard, FIG. 10A is a schematic diagram providing an exemplary illustration of the remote unit 408(1) among the remote units 408(1)-408(N) in the WDS 400 of FIG. 4 configured to generate the uplink digital communications signal 422(1) based on the uplink RF communications signal 420(1). Common elements between FIGS. 4 and 10A are shown therein with common element numbers and will not be re-described herein.

With reference to FIG. 10A, in a non-limiting example, the uplink RF communications signal 420(1) includes at least one first uplink RF signal 1000 and at least one second uplink RF signal 1002. The first uplink RF signal 1000 is received at a first carrier frequency $f_1$, and the second uplink RF signal 1002 is received at a second carrier frequency $f_2$. The first uplink RF signal 1000 includes a first discrete uplink channel 1004(1) and a second discrete uplink channel 1004(2). The second uplink RF signal 1002 includes a third discrete uplink channel 1004(3) and a fourth discrete uplink channel 1004(4). At least one first uplink bandpass filter 1006(1) and at least one second uplink bandpass filter 1006(2) filter the first uplink RF signal 1000 and the second uplink RF signal 1002, respectively.

The remote unit 408(1) includes at least one first analog mixer 1008(1) and at least one second analog mixer 1008(2). The first analog mixer 1008(1) is configured to frequency shift the first uplink RF signal 1000 from the first carrier frequency $f_1$ to a predefined frequency 1010, which is equal to zero (0), for example. The second analog mixer 1008(2) is configured to frequency shift the second uplink RF signal 1002 from the second carrier frequency $f_2$ to the predefined frequency 1010. The remote unit 408(1) includes at least one first ADC 1012(1) and at least one second ADC 1012(2). The first ADC 1012(1) converts the first uplink RF signal 1000 into at least one first uplink digital signal 1014(1), which is among the uplink digital signals 439(1)-439(P) of FIG. 4. The first uplink digital signal 1014(1) includes the first discrete uplink channel 1004(1) and the second discrete uplink channel 1004(2).

The second ADC 1012(2) converts the second uplink RF signal 1002 into at least one combined uplink digital signal 1016. The remote unit 408(1) includes a digital splitter 1018 configured to split the combined uplink digital signal 1016 into a second uplink digital signal 1014(2) and a third uplink digital signal 1014(3). The second uplink digital signal 1014(2) includes the third discrete uplink channel 1004(3). The third uplink digital signal 1014(3) includes the fourth discrete uplink channel 1004(4). The remote unit 408(1) includes a first digital down-converter (DDC) 1020(1) and a second DDC 1020(2). The first DDC 1020(1) down-shifts the third discrete uplink channel 1004(3) in the second uplink digital signal 1014(2) from the predefined frequency 1010 to a first down-shifted frequency 1022(1). The second DDC 1020(2) down-shifts the fourth discrete uplink channel 1004(4) in the third uplink digital signal 1014(3) from the predefined frequency 1010 to a second down-shifted frequency 1022(2). The second uplink digital signal 1014(2) and the third uplink digital signal 1014(3) are among the uplink digital signals 439(1)-439(P) of FIG. 4.

With continuing reference to FIG. 10A, each of the second uplink digital signal 1014(2) and the third uplink digital signal 1014(3) may include an I-component and a Q-component. In this regard, the first DDC 1020(1) is configured to shift the I-component and the Q-component of the second uplink digital signal 1014(2) separately. Likewise, the second DDC 1020(2) is configured to shift the I-component and the Q-component of the third uplink digital signal 1014(3) separately.

In a non-limiting example, the first analog mixer 1008(1) and the second analog mixer 1008(2) are analog I/Q modulators. In this regard, FIG. 10B is a schematic diagram of an exemplary analog I/Q modulator 1024 that can be provided in the remote unit 408(1) of FIG. 10A. Common elements between FIGS. 10A and 10B are shown therein with common element numbers and will not be re-described herein.

With reference to FIG. 10B, the analog I/Q modulator 1024 can be provided in the remote unit 408(1) of FIG. 10A as the first analog mixer 1008(1) and/or the second analog mixer 1008(2). The analog I/Q modulator 1024 includes a splitter 1026 that splits each of the first uplink RF signal 1000 and the second uplink RF signal 1002 into an I-signal 1028 and a Q-signal 1030. The analog I/Q modulator 1024 includes an I-signal mixer 1032 and a Q-signal mixer 1034. The I-signal mixer 1032 and the Q-signal mixer 1034 are configured to shift the I-signal 1028 and the Q-signal 1030, respectively, to the predefined frequency 1010 of FIG. 10A based on an oscillator 1036.

With reference back to FIG. 4, in a non-limiting example, the central unit 406 includes at least one central unit electrical-to-optical (E/O) converter 452. The central unit E/O converter 452 is configured to convert the downlink digital communications signals 412(1)-412(N) into a plurality of optical downlink digital communications signals 454(1)-454(N), respectively. The remote units 408(1)-408(N) include a plurality of remote unit optical-to-electrical (O/E) converters 456(1)-456(N). The remote unit O/E converters 456(1)-456(N) are configured to convert the optical downlink digital communications signals 454(1)-454(N) into the downlink digital communications signals 412(1)-412(N), respectively.

The remote units 408(1)-408(N) include a plurality of remote unit E/O converters 458(1)-458(N). The remote unit E/O converters 458(1)-458(N) convert the uplink digital communications signals 422(1)-422(N) into a plurality of optical uplink digital communications signals 460(1)-460(N), respectively. The central unit 406 includes at least one central unit O/E converter 462 configured to convert the optical uplink digital communications signals 460(1)-460(N) into the uplink digital communications signals 422(1)-422(N), respectively.

Figure 11:
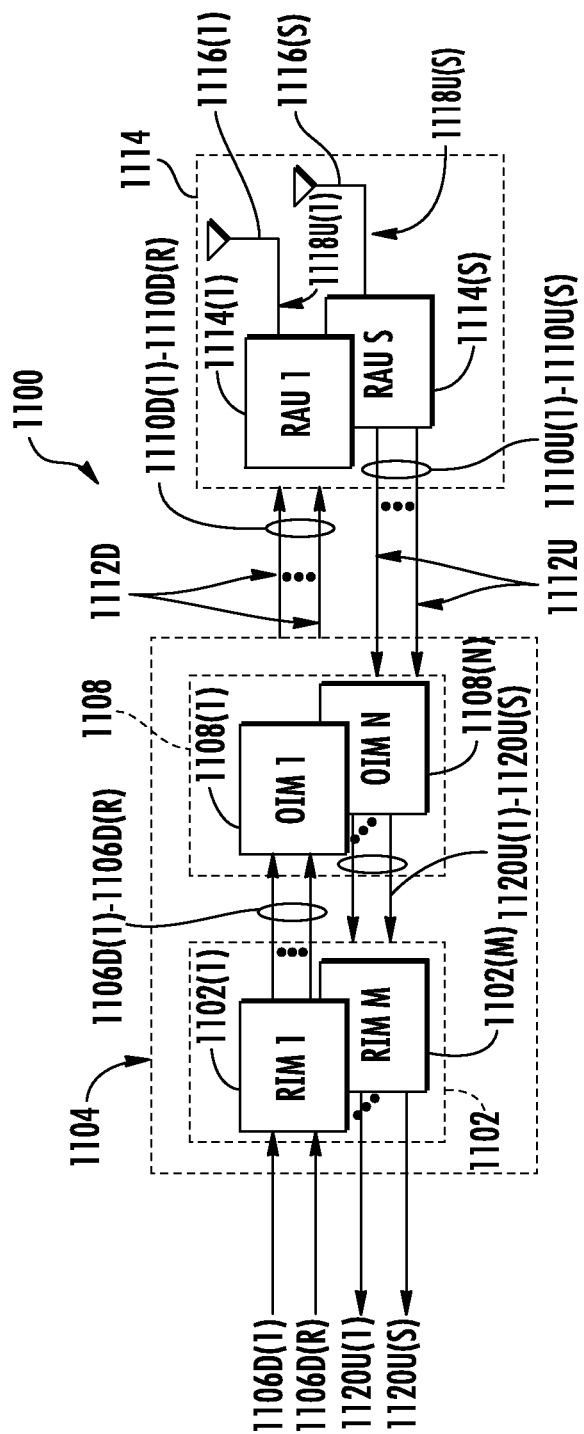
FIG. 11 is a schematic diagram of an exemplary optical fiber-based WDS that includes the central unit resource configuration system and the remote unit resource configuration systems of FIG. 4 for allocating the digital channels associated with the communications signals into the spectrum chunks of FIG. 4 based on a predefined spectrum-chunking algorithm and a predefined resource allocation policy.

FIG. 11 is a schematic diagram of an exemplary optical fiber-based WDS 1100 that can include the central unit resource configuration system 402 and the remote unit resource configuration systems 404(1)-404(N) of FIG. 4 for allocating digital channels associated with communications signals into assigned spectrum chunks based on a predefined spectrum-chunking algorithm and a predefined resource allocation policy. The optical fiber-based WDS 1100 includes an optical fiber for distributing communications services for multiple frequency bands. The optical fiber-based WDS 1100 in this example is comprised of three (3) main components. One or more radio interfaces provided in the form of RIMs 1102(1)-1102(M) are provided in a central unit 1104 to receive and process downlink electrical communications signals 1106D(1)-1106D(R) prior to optical conversion into downlink optical fiber-based communications signals. The downlink electrical communications signals 1106D(1)-1106D(R) may be received from a base station (not shown) as an example. The RIMs 1102(1)-1102(M) provide both downlink and uplink interfaces for signal processing. The notations "1-R" and "1-M" indicate that any number of the referenced component, 1-R and 1-M, respectively, may be provided. The central unit 1104 is configured to accept the plurality of RIMs 1102(1)-1102(M) as modular components that can easily be installed and removed or replaced in the central unit 1104. In one example, the central unit 1104 is configured to support up to twelve (12) RIMs 1102(1)-1102(12). Each RIM 1102(1)-1102(M) can be designed to support a particular type of signal source or range of signal sources (i.e., frequencies) to provide flexibility in configuring the central unit 1104 and the optical fiber-based WDS 1100 to support the desired signal sources.

For example, one RIM 1102 may be configured to support the Personal Communication Services (PCS) radio band. Another RIM 1102 may be configured to support the 800 MHz radio band. In this example, by inclusion of these RIMs 1102, the central unit 1104 could be configured to support and distribute communications signals on both PCS and LTE 700 radio bands, as an example. RIMs 1102 may be provided in the central unit 1104 that support any frequency bands desired, including but not limited to the US Cellular band, PCS band, Advanced Wireless Services (AWS) band, 700 MHz band, Global System for Mobile communications (GSM) 900, GSM 1800, and Universal Mobile Telecommunications System (UMTS). The RIMs 1102(1)-1102(M) may also be provided in the central unit 1104 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 1102(1)-1102(M) may be provided in the central unit 1104 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 11, the downlink electrical communications signals 1106D(1)-1106D(R) are provided to a plurality of optical interfaces provided in the form of optical interface modules (OIMs) 1108(1)-1108(N) in this embodiment to convert the downlink electrical communications signals 1106D(1)-1106D(R) into downlink optical fiber-based communications signals 1110D(1)-1110D(R). The notation "1-N" indicates that any number of the referenced component 1-N may be provided. The OIMs 1108(1)-1108(N) may be configured to provide one or more optical interface components (OICs) that contain optical to electrical (O/E) and electrical to optical (E/O) converters (not shown), as will be described in more detail below. The OIMs 1108(1)-1108(N) support the radio bands that can be provided by the RIMs 1102(1)-1102(M), including the examples previously described above.

The OIMs 1108(1)-1108(N) each include E/O converters to convert the downlink electrical communications signals 1106D(1)-1106D(R) into the downlink optical fiber-based communications signals 1110D(1)-1110D(R). The downlink optical fiber-based communications signals 1110D(1)-1110D(R) are communicated over a downlink optical fiber-based communications medium 1112D to a plurality of remote units 1114(1)-1114(S), which may be remote antenna units ("RAUs 1114(1)-1114(S)"). The notation "1-S" indicates that any number of the referenced component 1-S may be provided. O/E converters provided in the remote units 1114(1)-1114(S) convert the downlink optical fiber-based communications signals 1110D(1)-1110D(R) back into the downlink electrical communications signals 1106D(1)-1106D(R), which are provided to antennas 1116(1)-1116(S) in the remote units 1114(1)-1114(S) to distribute to client devices (not shown) in the reception range of the antennas 1116(1)-1116(S).

E/O converters are also provided in the remote units 1114(1)-1114(S) to convert uplink electrical communications signals 1118U(1)-1118U(S) received from client devices through the antennas 1116(1)-1116(S) into uplink optical fiber-based communications signals 1110U(1)-1110U(S). The remote units 1114(1)-1114(S) communicate the uplink optical fiber-based communications signals 1110U(1)-1110U(S) over an uplink optical fiber-based communications medium 1112U to the OIMs 1108(1)-1108(N) in the central unit 1104. The OIMs 1108(1)-1108(N) include O/E converters that convert the received uplink optical fiber-based communications signals 1110U(1)-1110U(S) into uplink electrical communications signals 1120U(1)-1120U(S), which are processed by the RIMs 1102(1)-1102(M) and provided as uplink electrical communications signals 1120U(1)-1120U(S). The central unit 1104 may provide the uplink electrical communications signals 1120U(1)-1120U(S) to a base station or other communications system.

Note that the downlink optical fiber-based communications medium 1112D and the uplink optical fiber-based communications medium 1112U connected to each remote unit 1114(1)-1114(S) may be a common optical fiber-based communications medium, wherein for example, wave division multiplexing (WDM) may be employed to provide the downlink optical fiber-based communications signals 1110D(1)-1110D(R) and the uplink optical fiber-based communications signals 1110U(1)-1110U(S) on the same optical fiber-based communications medium.

Figure 12:
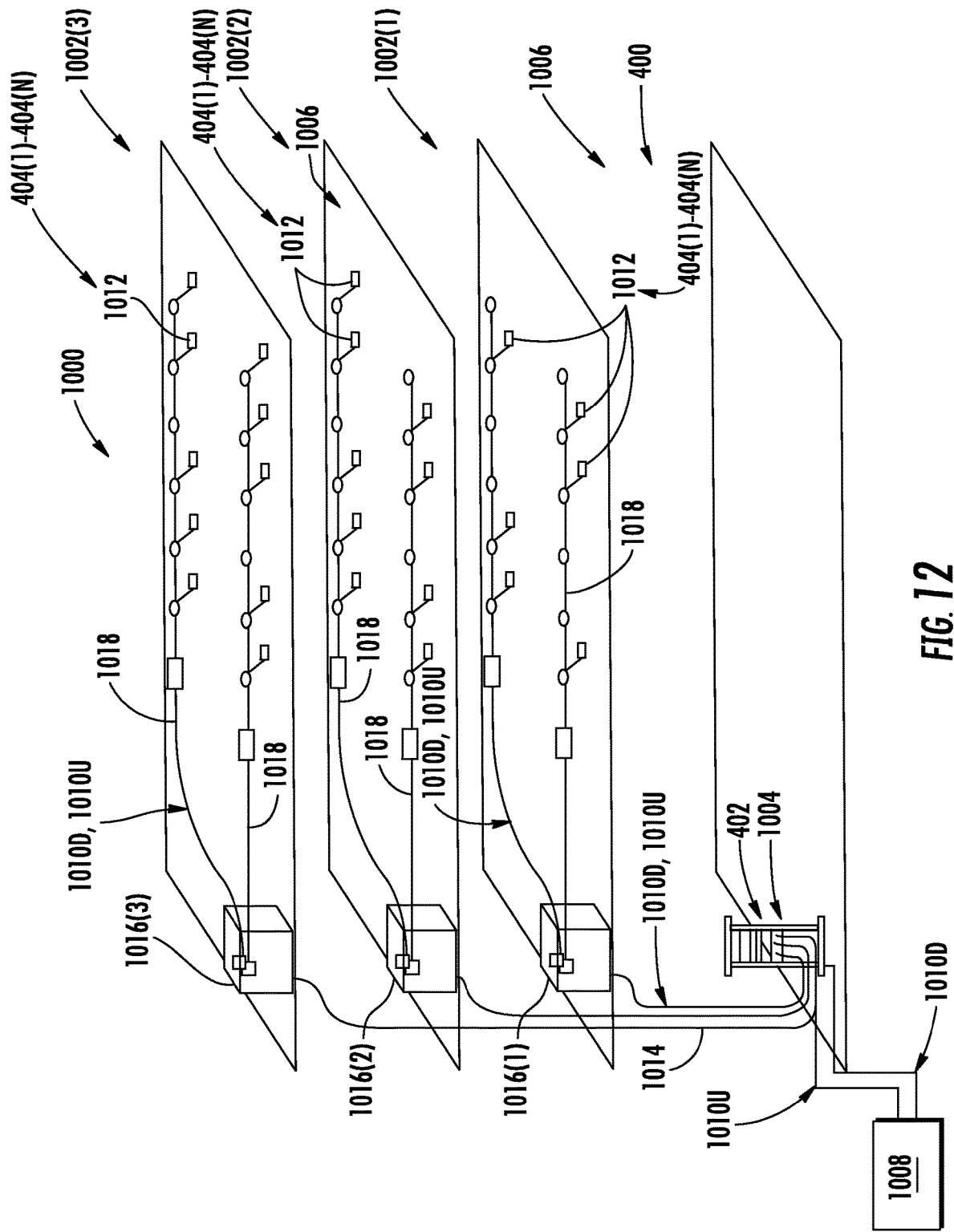
FIG. 12 is a partial schematic cut-away diagram of an exemplary building infrastructure in which a WDS(s), including the WDSs of FIGS. 4 and 11, is configured to allocate digital channels associated with communications signals into spectrum chunks.

The WDS 400 of FIG. 4 can be provided in a WDS provided in an indoor environment, as illustrated in FIG. 12. FIG. 12 is a partial schematic cut-away diagram of an exemplary building infrastructure 1200 in which a WDS(s), including the WDS 400 of FIG. 4 and the optical fiber-based WDS 1100 of FIG. 11, is configured to allocate digital channels associated with communications signals into spectrum chunks. The building infrastructure 1200 in this embodiment includes a first (ground) floor 1202(1), a second floor 1202(2), and a third floor 1202(3). The floors 1202(1)-1202(3) are serviced by a central unit 1204 to provide antenna coverage areas 1206 in the building infrastructure 1200. The central unit 1204, which can include the central unit resource configuration system 402 of FIG. 4, is communicatively coupled to a base station 1208 to receive downlink communications signals 1210D from the base station 1208. The central unit 1204 is communicatively coupled to a plurality of remote units 1212, which can include the remote unit resource configuration systems 404(1)-404(N) of FIG. 4, to distribute the downlink communications signals 1210D to the remote units 1212 and to receive uplink communications signals 1210U from the remote units 1212, as previously discussed above. The downlink communications signals 1210D and the uplink communications signals 1210U communicated between the central unit 1204 and the remote units 1212 are carried over a riser cable 1214. The riser cable 1214 may be routed through interconnect units (ICUs) 1216(1)-1216(3) dedicated to each of the floors 1202(1)-1202(3) that route the downlink communications signals 1210D and the uplink communications signals 1210U to the remote units 1212 and also provide power to the remote units 1212 via array cables 1218.

The embodiments disclosed herein include controllers (e.g., the configuration controller 436 of FIGS. 4 and 5) and modules. The controllers and modules may be provided as microprocessors or microcontrollers.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for allocating processing circuitry resources in a communications system, comprising:
   determining a predefined total processing circuitry resource for processing a plurality of incoming digital signals, wherein the plurality of incoming digital signals comprises a plurality of discrete channels;
   determining whether the predefined total processing circuitry resource is underutilized;
   processing the plurality of incoming digital signals based at least in party on a channel grouping scheme;
   allocating each of the plurality of discrete channels to a spectrum chunk based at least in part on a spectrum chunk map comprising one or more spectrum chunks, each of the one or more spectrum chunks assigned with at least one discrete channel among the plurality of discrete channels and allocated a processing circuitry resource that is less than or equal to the predefined total processing circuitry resource;
   processing each of the one or more spectrum chunks based at least in part on the processing circuitry resource allocated to the spectrum chunk;
   generating a plurality of outgoing digital signals each comprising at least one spectrum chunk among the one or more spectrum chunks;
   determining the spectrum chunk map based at least in party on a predefined spectrum-chunking algorithm; and
   assigning the plurality of discrete channels to the one or more spectrum chunks comprised in the determined spectrum chunk map.

2. The method of claim 1, further comprising allocating the processing circuitry resource to each of the one or more spectrum chunks based at least in party on a predefined resource allocation policy.

3. The method of claim 2, further comprising retrieving the predefined resource allocation policy from a resource allocation policy database.

4. The method of claim 2, further comprising:
   receiving a plurality of downlink digital signals corresponding to a plurality of discrete downlink channels;
   allocating each of the plurality of discrete downlink channels to the assigned spectrum chunk based at least in party on the spectrum chunk map; and
   processing each of the one or more spectrum chunks based at least in party on the processing circuitry resource allocated to the spectrum chunk.

5. The method of claim 4, further comprising generating a plurality of downlink digital communications signals each comprising the at least one spectrum chunk among the one or more spectrum chunks.

6. The method of claim 2, further comprising:
   receiving a plurality of uplink digital signals corresponding to a plurality of discrete uplink channels; and allocating each of the plurality of discrete uplink channels to the assigned spectrum chunk based at least in party on the spectrum chunk map.

7. The method of claim 6, further comprising:
processing each of the one or more spectrum chunks based at least in party on the processing circuitry resource allocated to the spectrum chunk; and
generating a plurality of uplink digital communications signals each comprising the at least one spectrum chunk among the one or more spectrum chunks.

8. A method for allocating processing circuitry resources in a communications system, comprising:
determining a predefined total processing circuitry resource for processing the plurality of incoming digital signals, wherein a plurality of incoming digital signals comprises a plurality of discrete channels;
determining whether the predefined total processing circuitry resource is underutilized;
processing the plurality of incoming digital signals in response to determining that the predefined total processing circuitry resource is underutilized;
allocating each of the plurality of discrete channels to a spectrum chunk based at least in party on a spectrum chunk map comprising one or more spectrum chunks, each of the one or more spectrum chunks assigned with at least one discrete channel among the plurality of discrete channels and allocated a processing circuitry resource that is less than or equal to the predefined total processing circuitry resource;
processing the one or more spectrum chunks based at least in party on the processing circuitry resource allocated to the spectrum chunk;
generating a plurality of outgoing digital signals each comprising at least one spectrum chunk among the one or more spectrum chunks; and
determining the spectrum chunk map based at least in party on a predefined spectrum-chunking algorithm.

9. The method of claim 8, further comprising:
determining the spectrum chunk map based at least in party on a predefined spectrum-chunking algorithm; and
assigning the plurality of discrete channels to the one or more spectrum chunks comprised in the determined spectrum chunk map.

10. The method of claim 9, further comprising allocating the processing circuitry resource to each of the one or more spectrum chunks based at least in party on a predefined resource allocation policy.

11. The method of claim 10, further comprising retrieving the predefined resource allocation policy from a resource allocation policy database.

12. The method of claim 9, further comprising:
receiving a plurality of downlink digital signals corresponding to a plurality of discrete downlink channels; and
allocating each of the plurality of discrete downlink channels to the assigned spectrum chunk based at least in party on the spectrum chunk map.

13. The method of claim 12, further comprising:
processing each of the one or more spectrum chunks based at least in party on the processing circuitry resource allocated to the spectrum chunk; and
generating a plurality of downlink digital communications signals each comprising the at least one spectrum chunk among the one or more spectrum chunks.

14. The method of claim 9, further comprising:
receiving a plurality of uplink digital signals corresponding to a plurality of discrete uplink channels; and
allocating each of the plurality of discrete uplink channels to the assigned spectrum chunk based at least in party on the spectrum chunk map.

15. The method of claim 14, further comprising:
processing each of the one or more spectrum chunks based at least in party on the processing circuitry resource allocated to the spectrum chunk; and
generating a plurality of uplink digital communications signals each comprising the at least one spectrum chunk among the one or more spectrum chunks.

16. A method for allocating processing circuitry resources a communications system, comprising:
determining a total processing circuitry resource for processing the plurality of incoming digital signals, wherein the plurality of incoming digital signals comprises a plurality of discrete channels;
determining whether the total processing circuitry resource is underutilized;
processing the plurality of incoming digital signals based at least in party on a channel grouping scheme in response to determining that the total processing circuitry resource is underutilized;
allocating the plurality of discrete channels to a spectrum chunk based at least in party on a spectrum chunk map comprising one or more spectrum chunks, each of the one or more spectrum chunks assigned with at least one discrete channel among the plurality of discrete channels and allocated a processing circuitry resource that is less than or equal to the total processing circuitry resource;
processing each of the one or more spectrum chunks based at least in party on the processing circuitry resource allocated to the spectrum chunk;
generating a plurality of outgoing digital signals each comprising at least one spectrum chunk among the one or more spectrum chunks
determining the spectrum chunk map based at least in party on a predefined spectrum-chunking algorithm;
assigning the plurality of discrete channels to the one or more spectrum chunks comprised in the determined spectrum chunk map; and
allocating the processing circuitry resource to each of the one or more spectrum chunks based at least in party on a predefined resource allocation policy.

17. The method of claim 16, further comprising:
receiving a plurality of downlink digital signals corresponding to a plurality of discrete downlink channels; and
allocating each of the plurality of discrete downlink channels to the assigned spectrum chunk based at least in party on the spectrum chunk map.

18. The method of claim 17, further comprising:
processing each of the one or more spectrum chunks based at least in party on the processing circuitry resource allocated to the spectrum chunk; and
generating a plurality of downlink digital communications signals each comprising the at least one spectrum chunk among the one or more spectrum chunks.

19. The method of claim 16, further comprising:
receiving a plurality of uplink digital signals corresponding to a plurality of discrete uplink channels; and
allocating each of the plurality of discrete uplink channels to the assigned spectrum chunk based at least in party on the spectrum chunk map.

20. The method of claim 19, further comprising:
processing each of the one or more spectrum chunks based at least in party on the processing circuitry resource allocated to the spectrum chunk; and
generating a plurality of uplink digital communications signals each comprising the at least one spectrum chunk among the one or more spectrum chunks.

* * * * *